(12) United States Patent
Shoop et al.

(10) Patent No.: US 11,246,331 B2
(45) Date of Patent: Feb. 15, 2022

(54) COATED BITE-SIZED SNACKS

(71) Applicant: THE J. M. SMUCKER COMPANY, Orrville, OH (US)

(72) Inventors: Andrea Wunder Shoop, Lexington, KY (US); Nathaniel David Kennedy, Lexington, KY (US); Patricia Rene Wireman, Lexington, KY (US)

(73) Assignee: THE J. M. SMUCKER COMPANY, Orrville, OH (US)

( * ) Notice: Subject to any disclaimer, the term of this patent is extended or adjusted under 35 U.S.C. 154(b) by 221 days.

(21) Appl. No.: 16/009,392

(22) Filed: Jun. 15, 2018

(65) Prior Publication Data

US 2018/0368452 A1    Dec. 27, 2018

Related U.S. Application Data

(60) Provisional application No. 62/525,410, filed on Jun. 27, 2017, provisional application No. 62/553,268, filed on Sep. 1, 2017.

(51) Int. Cl.
| | |
|---|---|
| *A23L 25/10* | (2016.01) |
| *A23L 7/126* | (2016.01) |
| *A23P 20/10* | (2016.01) |
| *A23G 1/00* | (2006.01) |

(52) U.S. Cl.
CPC ............ *A23L 25/10* (2016.08); *A23G 1/0013* (2013.01); *A23G 1/0036* (2013.01); *A23G 1/0046* (2013.01); *A23G 1/0056* (2013.01); *A23L 7/126* (2016.08); *A23P 20/10* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 3,723,131 A | 3/1973 | Bixby et al. | |
| 3,787,588 A | 1/1974 | Turitz | |
| 4,053,650 A | 10/1977 | Chino et al. | |
| 4,543,262 A * | 9/1985 | Michnowski | ........... A23L 33/40 426/306 |
| 4,596,714 A | 6/1986 | Brabbs | |
| 4,605,561 A | 8/1986 | Lang | |

(Continued)

OTHER PUBLICATIONS

Brien, Posie. "How to make homemade granola". Available online as of Apr. 18, 2015 from www.kingarthurbaking.com. pp. 1-16. (Year: 2015).*

(Continued)

*Primary Examiner* — Jenna A Watts
(74) *Attorney, Agent, or Firm* — Michael A. Olshavsky; Christopher L. Smith

(57) ABSTRACT

The invention relates to small edible portions (i.e., bite-sized snacks) comprising a soft nut butter inner core coated with a crunchy grain-based outer coating. The bite-sized snacks have an equivalent spherical diameter of about 1 to 3 cm. Texture analysis of the bite-sized snacks determines that the bite-sized snacks have a soft texture with an average peak force in the range of about 800-5,000 g and an average positive area in the range of about 2,000-15,000 g*sec. The bite-sized snacks unexpected have both a soft and crunchy texture and are surprisingly shelf stable.

18 Claims, 28 Drawing Sheets

(56) References Cited

U.S. PATENT DOCUMENTS

| | | |
|---|---|---|
| 4,663,175 A | 5/1987 | John et al. |
| 5,498,438 A | 3/1996 | Strong et al. |
| 5,571,546 A | 11/1996 | Kristinus et al. |
| 7,803,418 B2 | 9/2010 | Garter et al. |
| 7,867,537 B2 | 1/2011 | Karwowski et al. |
| 7,887,863 B2 | 2/2011 | Graham et al. |
| 7,935,372 B2 | 5/2011 | Slegers et al. |
| 8,119,181 B2 | 2/2012 | Anand et al. |
| 8,486,470 B2 | 7/2013 | Laukli et al. |
| 8,790,736 B2 | 7/2014 | Smith et al. |
| 9,427,014 B2 | 8/2016 | Graham et al. |
| 2006/0134285 A1 | 6/2006 | Schnieber et al. |
| 2009/0155423 A1 | 6/2009 | Moore et al. |
| 2009/0208609 A1* | 8/2009 | Lawson .................... A23L 7/10 426/93 |
| 2009/0220654 A1* | 9/2009 | Kino ...................... A21D 13/31 426/94 |
| 2011/0104356 A1 | 5/2011 | Coleman et al. |
| 2012/0231121 A1 | 9/2012 | Dijkhuis et al. |
| 2014/0220218 A1 | 8/2014 | Coleman |

OTHER PUBLICATIONS

Office action dated Aug. 23, 2019 in corresponding Canadian Application No. 3009907.

* cited by examiner (COMPARISON - AT TIME 0 OR START OF AGING STUDY)

(COMPARISON - 4 WKS AT 70 °F (21 °C))

(COMPARISON - 4 WKS AT 90 °F (32 °C))

(COMPARISON - 4 WKS AT 100 °F (38 °C))

(COMPARISON - 4 WKS AT 120 °F (49 °C))

(COMPARISON - OIL LOSS, WK 1-4 @ 70 °F (21 °C))

(COMPARISON - OIL LOSS, WK 1-4 @ 90 °F (32 °C))

(COMP - OIL LOSS, WK 1-4 @ 100 F (38 C))

(COMP - OIL LOSS, WK 1-4 @ 120 °F (49 °C))

(COMP - MOISTURE LOSS, WK 1-4 @ 70 °F (21 °C))

(COMP - MOISTURE LOSS, WK 1-4 @ 90 °F (32 °C))

(COMP - MOISTURE LOSS, WK 1-4 @ 100 °F (38 °C))

(COMP - MOISTURE LOSS, WK 1-4 @ 120 °F (49 °C))

(COMP - OVERALL WT LOSS, WK 1-4 @ 70 °F (21 °C))

(COMP - OVERALL WT LOSS, WK 1-4 @ 90 °F (32 °C))

(COMP - OVERALL WT LOSS, WK 1-4 @ 100 °F (38 °C))

(COMP - OVERALL WT LOSS, WK 1-4 @ 120 °F (49 °C))

| Brand | INV | Comp B - Gluten Free Bites | Comp A - Skippy P. B. Bites - Double Peanut Butter |
|---|---|---|---|
| Serving size (g) | 40 | 24 | 30 |
| Average Bite Weight (g) | 6.35 | 11.84 | 3.00 |
| Nutrition Info PER BITE | | | |
| Bites Per Serving | 6.30 | 2.03 | 9.99 |
| Calories | 31.75 | 49.35 | 16.02 |
| Total Fat (g) | 1.91 | 2.96 | 1.00 |
| Saturated Fat (g) | 0.40 | 0.49 | 0.70 |
| Trans Fat (g) | 0.00 | 0.00 | 0.00 |
| Cholesterol (mg) | 0.00 | 0.00 | 0.50 |
| Sodium (mg) | 18.26 | 12.34 | 12.01 |
| Total Carb (g) | 3.18 | 4.94 | 1.40 |
| Dietary Fiber (g) | 0.48 | 0.99 | 0.00 |
| Sugar (g) | 1.27 | 1.97 | 0.80 |
| Protein (g) | 0.95 | 2.47 | 0.50 |
| | | | |
| Nutrition Info PER 100 g of bites | | | |
| Calories | 500 | 417 | 533 |
| Total Fat (g) | 30 | 25 | 33 |
| Saturated Fat (g) | 6.3 | 4.2 | 23.3 |
| Trans Fat (g) | 0.00 | 0.00 | 0.00 |
| Cholesterol (mg) | 0.00 | 0.00 | 17 |
| Sodium (mg) | 287.5 | 104.3 | 399.6 |
| Total Carb (g) | 50 | 42 | 47 |
| Dietary Fiber (g) | 8 | 8 | 0 |
| Sugar (g) | 20 | 17 | 27 |
| Protein (g) | 15 | 21 | 17 |

Fig. 9

(COMP - TOTAL OIL LOSS VS TEMPERATURE)

(COMP - TOTAL MOISTURE LOSS VS TEMPERATURE)

(COMP - TOTAL WEIGHT LOSS VS TEMPERATURE)

COATED BITE-SIZED SNACKS

TECHNICAL FIELD

The invention generally relates to peanut and nut butter compositions and methods of manufacture. More particularly, the invention relates to small edible portions (i.e., a bite-sized snack) comprising soft, smooth and creamy peanut butter or nut butter inner cores coated with a crunchy grain-based outer coating.

BACKGROUND OF THE INVENTION

Nut butters are typically prepared by roasting and blanching raw nuts and then grinding them. The resulting product is a soft plastic-like material, which is a mixture of nut particles and oil that is released from the cellular structure of the nuts during the grinding operation. Nut butters have pleasing organoleptic properties, such as a smooth and creamy texture that melts in the mouth, which enhance the consumer's enjoyment of the nut butter as it is eaten. Many consumers enjoy eating nut butters, such as peanut butter, directly out of the container with a spoon, because of the nut butter's appealing aroma, flavor, and its soft, smooth and creamy textures.

Nut butters, such as peanut butter, are valuable food sources. Nut butters typically have high-quality protein and "good" (mono- and polyunsaturated) fats. Unlike many meat products, nut butters do not have to be refrigerated or frozen during storage, but instead are shelf-stable for extended periods of time. Nut butters are typically less expensive than meat products, making them a useful source of high-quality protein for low-income populations. Because they are plant-based, nut butters also provide convenient, high-quality protein for vegetarians, vegans, and anyone who wishes to reduce their consumption of animal-based protein.

Because of these properties, nut butters are often incorporated into convenience foods and snack foods. Nut butters can be found in candy bars, cookies, granola bars, high-protein energy bars, and similar foods that are shelf-stable, easy to carry, and can be eaten directly out of the packaging without mess. Convenience foods containing nut butters are particularly popular as filling snacks between meals or as an energy source before or after exercise.

However, these convenience foods can also be disappointing to a consumer looking for the pleasing organoleptic properties of nut butter when eaten directly out of the container. Convenience foods and snack foods containing nut butters are often dry, crumbly, pasty, chewy, or have another texture that is unlike the soft, smooth and creamy textures of nut butter alone.

Accordingly, it would be desirable to provide a convenience food or snack food comprising nut butter that retains the soft, smooth and creamy textures and other pleasing organoleptic properties of nut butter alone. It would also be desirable to provide a convenience food or snack food comprising nut butter that is shelf-stable, portable, and easy to consume on the go.

SUMMARY OF THE INVENTION

In general, one aspect of the invention is to provide a bite-sized snack having an equivalent spherical diameter of about 1-3 cm, comprising a soft inner core containing at least one nut butter and at least one stabilizer, and a crunchy grain-based outer coating covering at least a portion of the outer surface of the inner core. When measured by a texture profile analyzer instrument fitted with a 10 kg load cell and a 1.1 inch diameter crunchiness fixture, and operated at a trigger force of 5 g, a test speed of 1 mm/s and a distance of 9 mm, the bite-sized snack exhibits a soft texture by having an average peak force in the range of about 800 g-5,000 g and an average positive area in the range of about 2,000 g*s-15,000 g*s.

Another aspect of the invention is to provide a bite-sized snack having an equivalent spherical diameter of about 1-3 cm, comprising a soft inner core containing at least one nut butter and at least one stabilizer, and a crunchy grain-based outer coating covering at least a portion of the outer surface of the inner core, wherein even after 4 weeks of aging at various temperatures (70, 90, 100 and 120 F), these bite sized snacks continue to exhibit a soft texture by having an average peak force in the range of about 800 g-5,000 g and an average positive area in the range of about 2,000 g*s-15,000 g*s as measured by a texture profile analyzer instrument fitted with a 10 kg load cell and a 1.1 inch diameter crunchiness fixture, and operated at a trigger force of 5 g, a test speed of 1 mm/s and a distance of 9 mm.

Another aspect of the invention is to provide a package containing a plurality of bite-sized snacks, each bite-sized snack having an equivalent spherical diameter of about 1-3 cm. Each bite-sized snack comprises a soft inner core containing at least one nut butter and at least one stabilizer, and a crunchy grain-based outer coating covering at least a portion of the outer surface of the inner core. When measured by a texture profile analyzer instrument fitted with a 10 kg load cell and a 1.1 inch diameter crunchiness fixture, and operated at a trigger force of 5 g, a test speed of 1 mm/s and a distance of 9 mm, each bite-sized snack exhibits a soft texture by having an average peak force in the range of about 800 g-5,000 g and an average positive area in the range of about 2,000 g*s-15,000 g*s.

Yet another aspect of the invention is to provide a shelf-stable bite-sized snack having an equivalent spherical diameter in the range of about 1-3 cm, comprising a soft inner core containing at least one nut butter and at least one stabilizer, and a crunchy grain-based outer coating covering at least a portion of the outer surface of the inner core. The shelf stability of the bite-sized snack is determined by measuring the % total weight loss exhibited after holding the bite-sized snack at an elevated temperature for a period of 4 weeks, and the bite sized snack exhibits about less than 1.75% total weight loss when the elevated temperature is 70° F., is less than 2.25% total weight loss when the elevated temperature is 90° F., is less than 2.35% total weight loss when the elevated temperature is 100° F., is less than 5.5% total weight loss when the elevated temperature is 120° F.

BRIEF DESCRIPTION OF THE DRAWINGS

FIG. 9 is a table showing the nutritional information for the inventive bite-sized snack, comparative sample COMP A, and comparative sample COMP B.

Figure 1:
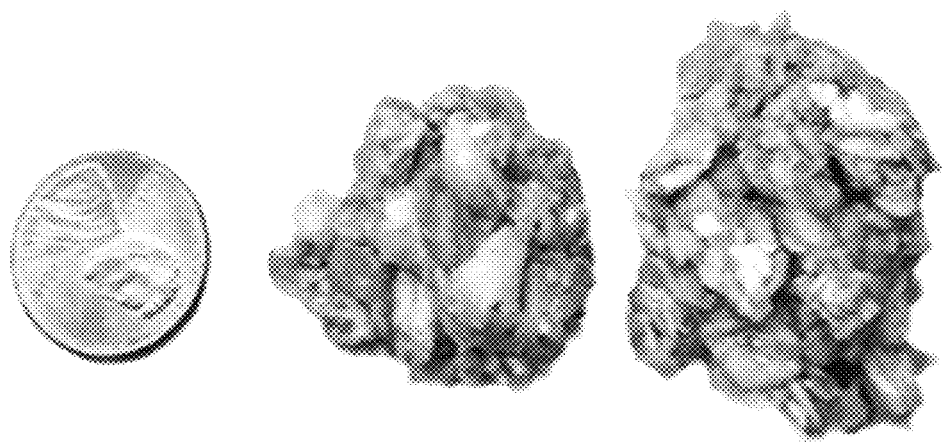
FIG. 1 is a photograph of representative samples of the inventive bite-sized snacks.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims. For a better understanding of the invention, its advantages and specific objects attained by its uses, reference is made to the accompanying descriptive matter in which various embodiments of the invention are illustrated.

DETAILED DESCRIPTION OF THE INVENTION

The following discussion is presented to enable a person skilled in the art to make and use one or more of the present embodiments. The general principles described herein may be applied to embodiments and applications other than those detailed below without departing from the spirit and scope of the disclosure. Therefore, the present embodiments are not intended to be limited to the particular embodiments shown, but are to be accorded the widest scope consistent with the principles and features disclosed or suggested herein.

Unless otherwise defined, all technical and scientific terms used herein have the same meaning as is commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as weight percent, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Notwithstanding that the numerical ranges and parameters setting forth the broad scope of the invention are approximations; the numerical values set forth in the specific examples are reported with relative precision. Any numerical values, however, may inherently contain certain errors necessarily resulting from error found in their respective measurements. As used herein, all percentages (%) are by weight, unless otherwise indicated.

As used herein, the term "nut" is used in the culinary sense, and includes any high-protein, oily legume, nut, or seed used in food. Examples of nuts include, without limitation, peanuts, almonds, pistachios, pecans, walnuts, cashews, macadamia nuts, hazelnuts, Brazilian nuts, pine nuts, sunflower seeds, sesame seeds, pumpkin seeds, soybeans, chickpeas, lentils, and mixtures thereof. In some exemplary embodiments, peanuts are used because of their flavor and because they are relatively inexpensive.

As used herein, the term "nut butter" means a spreadable food product comprising a mixture of ground legumes, ground nuts, ground seeds, or mixtures thereof and fat/oil, plus other optional ingredients such as, but not limited to, nut flours, thickening agents, flavorants, flavor enhancers, wax, and mixtures thereof.

While embodiments of the invention may be generally described in terms of peanuts and peanut butter, it should be readily apparent that other nut butters (i.e., butters from legumes, nuts, or seeds) are considered within the scope of the embodiments of the invention. In one embodiment, the nut butter composition comprises about 87.0-97.0 wt. % of the at least one type of ground legumes, ground nuts or ground seeds. Representative nut butters include, but are not limited to, Jif® brand Almond Butter, Jif® brand Cashew Butter, Jif® brand Hazelnut Butter and Jif® brand Peanut Butter.

As used herein, the term "grain-based" means a product comprising whole grains, processed grains, cracked grains, grain flakes, puffed grains, ground grains, grain flours, sprouted grains, or other food products comprising grain or grain components. Examples of grains used in grain-based products include, but are not limited to, oats, wheat, barley, rye, corn, quinoa, rice, spelt, amaranth, triticale, and mixtures thereof.

As used herein, the term "grain-based outer coating" means a dry particulate material comprising grain particles which is used to cover at least a portion of the outer surface of an inner core material. The sizes of the grain particles may range from moderately large, such as whole oats or puffed rice, to moderately small, such as cornmeal or bulgur, to very small, such as wheat flour or other grain flour, and including mixtures thereof.

As used herein, the term "granola" means a ready-to-eat food product that is a dry mixture comprising a grain-based product plus other optional ingredients such as binders to assist in holding the grain-based product together including, for example, a sweetening agent, brown rice syrup, corn starch, or combinations thereof. Granola may also comprise protein sources (e.g., powdered milk or powdered soy), whole nuts, broken nut pieces, dried fruit, or combinations thereof.

The bite-sized snack of the present invention comprises a soft, smooth and creamy nut butter inner core and a crunchy grain-based outer coating covering at least a portion of the outer surface of the nut butter inner core. The nut butter inner core comprises a nut butter and a stabilizer. The bite-sized snack has an irregular shape, without any rotational symmetry. Alternatively, the shape can approximate, for example, a cuboid, cylindrical, oblong, pyramidal, rectangular-prismatic, rhomboidal or spheroidal shape. The bite-sized snack has an equivalent spherical diameter of about 1-3 cm. The bite-sized snack can be described as "spoon sized," meaning the bite-sized snack should be of an overall size and shape for the entire bite-sized snack to fit comfortably in the bowl of a spoon and also within an adult human's mouth. Representative examples of the inventive bite-sized snack, showing the overall size and shape of the bite-sized snack, are shown in FIG. 1.

In certain embodiments of the invention, the nut butter inner core comprises a nut butter, a stabilizer, and nut powder. The inner core may further comprise sweeteners, salt, emulsifiers, flavorants, thickening agents, and mixtures thereof.

The nut butter is made from roasted nuts that are ground into a paste of nut particles and nut oil. In certain embodiments, the nut butter comprises roasted peanuts that are ground into a paste of peanut particles and peanut oil. In certain embodiments, the nut butter comprises roasted and ground peanuts, where the fineness of the grind associated with the ground peanut particles ranges from about 4.0 mils (about 100 μm) to about 32.0 mils (about 813 μm). In other embodiments, the nut butter comprises roasted and ground peanuts having a fine grind, where the fineness of the grind associated with the finely ground peanut particles ranges from about 4.0 mils (about 100 μm) to about 6.0 mils (about 153 μm), and preferably from about 4.5 mils (about 114 μm) to about 5.5 mils (about 140 μm). In other embodiments, the nut butter comprises roasted and ground peanuts having a medium grind, where the fineness of the grind associated with the medium ground peanut particles ranges from about 6.0 mils (about 153 μm) to about 23.0 mils (about 585 μm), and preferably from about 13.0 mils (about 330 μm) to about 17.0 mils (about 432 μm). In still other embodiments, the nut butter comprises roasted and ground peanuts having a course grind, where the fineness of the grind associated with the course-ground peanut particles ranges from about 23.0 mils (about 584 μm) to about 29.0 mils (about 737 μm).

The nut butter in the inner core also comprises at least one stabilizer. In certain embodiments, the stabilizer used in the nut butter comprises a "hard" fat comprising triglycerides with saturated fatty acids. The triglycerides in the hard fat may comprise greater than about 75% fatty acids selected from palmitic acid, stearic acid, arachidic acid, behenic acid, lignoceric acid, and combinations thereof. The amount of hard fat added to the nut butter may be from about 1 wt. % to about 8 wt. %, including from about 1.5 wt. % to about 7 wt. %, including from about 2 wt. % to about 6 wt. %, including from about 2.5 wt. % to about 5.5 wt. %, including from about 3 wt. % to about 5 wt. %, and including from about 4 wt. % to about 4.5 wt. % of the total weight of the nut butter in the inner core. In some exemplary embodiments, non-triglyceride stabilizers are used, such as monoglycerides, diglycerides, mixtures of mono- and diglycerides, waxes (e.g., plant waxes and petroleum waxes), mixtures thereof, and mixtures thereof with triglycerides.

The nut butter in the inner core may also comprise sweeteners. These sweeteners may include sugar (sucrose), brown sugar, molasses, honey, corn syrup, high fructose corn syrup, maple syrup, maltodextrin, brown rice syrup, and mixtures thereof. Suitable sweeteners may also include sugar alcohols, high intensity sweeteners (both natural and artificial), and mixtures thereof. Sweeteners may be present at amounts ranging from 0.1 wt. % to about 8 wt. %, including from about 0.5 wt. % to about 7.5 wt. %, from about 1 wt. % to about 7 wt. %, from about 1.5 wt. % to about 6.5 wt. %, from about 2 wt. % to about 6 wt. %, from about 2.5 wt. % to about 5.5 wt. %, from about 3 wt. % to about 5 wt. %, from about 3.5 wt. % to about 4.5 wt. %, and from about 4 wt. % to about 6.3 wt. % of the total weight of the nut butter in the inner core.

The nut butter in the inner core may also comprise salt. The salt is typically sodium chloride, but, in certain embodiments, may comprise potassium chloride or combinations of sodium chloride and potassium chloride. Salt may be present at amounts from about 0.1 wt. % to about 1.2 wt. %, including about 0.2 wt. % to about 1.1 wt. %, including about 0.3 wt. % to about 1.0 wt. %, including about 0.4 wt. % to about 0.9 wt. %, including about 0.5 wt. % to about 0.8 wt. %, including about 0.6 wt. % to about 0.7 wt. %, and including about 0.75 wt. % to about 1.05 wt. % of the total weight of the nut butter in the inner core.

The nut butter in the inner core may also comprise nut oil in addition to the nut oil naturally present in the roasted and ground nuts. The additional nut oil typically comes from the same type of nut as used in the nut butter. The additional nut oil may be present at amounts from about 0.5 wt. % to about 5 wt. %, including from about 1 wt. % to about 4.5 wt. %, including from about 1.5 wt. % to about 4 wt. %, including from about 2 wt. % to about 3.5 wt. %, and including from about 2.5 wt. % to about 3 wt. % of the total weight of the nut butter in the inner core.

In certain embodiments, the nut butter in the inner core is slightly thickened, to achieve a viscosity and structural stability needed to form and retain the shape of the bite-sized snack inner core. In certain embodiments, the thickening agent used in the nut butter comprises nut flour. The amount of nut flour added to the nut butter may be from about 1 wt. % to about 10 wt. %, including from about 2 wt. % to about 9 wt. %, including from about 3 wt. % to about 8 wt. %, including from about 4 wt. % to about 7 wt. %, including from about 4.5 wt. % to about 6 wt. %, and including from about 5 wt. % to about 5.5 wt. % of the total weight of the nut butter in the inner core.

The nut butter used to form the inner core may be made by manufacturing methods known by those skilled in the art. Once mixed, the nut butter core composition can be formed into the inner cores of the bite-sized snacks by forming methods known by those skilled in the art. In certain embodiments, the nut butter inner cores are formed by extrusion. In some exemplary embodiments, the nut butter inner cores are formed by injection molding.

For the bite-sized snacks, the outer coating comprises a grain-based outer coating. The grain-based outer coating may comprise whole grains, processed grains, cracked grains, grain flakes, puffed grains, ground grains, grain flours, or other food products comprising grain or grain components. Because the bite-sized snacks are intended to be eaten without further cooking, the grain-based outer coating typically comprises pre-cooked or ready-to-eat grain components.

Examples of grain particles used in a grain-based outer coating include, but are not limited to, whole oats, rolled oats, rolled rye, cracked wheat, bulgur, barley meal, corn meal, quinoa, wheat flakes, barley flakes, rye flakes, corn flakes, oat flakes, quinoa flakes, rice flakes, multigrain flakes, puffed oats, puffed wheat, puffed corn, puffed rice, rice crisps, puffed quinoa, puffed rye, wheat flour, barley flour, rye flour, oat flour, rice flour, and mixtures thereof.

In certain embodiments, the grain-based outer coating is a granola. Granola typically comprises at least one grain-based product. In certain embodiments, granola comprises oats (whole or rolled) and at least one other grain-based product. In certain embodiments, granola comprises rolled oats and rice crisps. In other embodiments, granola comprises rolled oats and barley flakes.

Granola also typically comprises at least one sweetening agent. Sweetening agents used in granola include, but not limited to, sugar, brown rice syrup, brown sugar honey, molasses, maple syrup, corn syrup, agave, and mixtures thereof. In certain embodiments, granola comprises brown rice syrup. In certain embodiments, granola comprises brown rice syrup and honey. In certain embodiments, granola comprises brown rice syrup and molasses. In certain embodiments, granola comprises brown sugar. In certain embodiments, granola comprises brown sugar and honey. In certain embodiments, granola comprises brown sugar and molasses.

Granola may also comprise other edible ingredients, such as a protein source, whole nuts, broken nut pieces, dried fruit, or combinations thereof. Granola may comprise a protein source, including but not limited to powdered milk, powdered milk protein, powdered whey protein, powdered casein or caseinate salts, powdered soy protein, powdered pea protein, powdered bean protein, nut flours, nut butters, and mixtures thereof. Granola may also include whole or broken nuts or seeds, including but not limited to peanuts, almonds, pistachios, pecans, walnuts, cashews, macadamia nuts, hazelnuts, Brazilian nuts, pine nuts, sunflower seeds, sesame seeds, pumpkin seeds, flax seeds, poppy seeds, chia seeds, and combinations thereof. Granola may also comprise dehydrated or freeze-dried fruit, including but not limited to raisins, currants, coconut, apples, peaches, apricots, pears, dates, figs, cherries, cranberries, blueberries, raspberries, strawberries, blackberries, bananas, papaya, mango, and pineapple.

To form the bite-sized snacks, the nut butter inner cores are coated with the grain-based outer coating, using known methods. In some exemplary embodiments, the nut butter inner cores are coated with the grain-based outer coating using a tumble coater. In some exemplary embodiments, the grain-based outer coating covers at least a portion of the outer surface of the nut butter inner core. In some exemplary embodiments, the grain-based outer coating covers about half of the outer surface of the nut butter inner core. In some exemplary embodiments, the grain-based outer coating covers more than half of the outer surface of the nut butter inner core. In some exemplary embodiments, the grain-based outer coating covers substantially the entire outer surface of the nut butter inner core. In some exemplary embodiments, the grain-based outer coating covers the entire outer surface of the nut butter inner core.

In certain embodiments, the weight ratio of grain-based outer coating to nut butter inner core for each bite-sized snack ranges from about 70:30 wt./wt. to about 30:70 wt./wt. In certain embodiments, the weight ratio of grain-based outer coating to nut butter inner core for each bite-sized snack ranges from about 65:35 to about 35:65, including from about 60:40 to about 40:60, including about 55:45 to about 45:55, and including about 50:50, all ratios being wt./wt. In certain embodiments, the bite-sized snacks comprise about 70 wt. % grain-based outer coating and about 30 wt. % nut butter inner core. In certain embodiments, the bite-sized snacks comprise about 50 wt. % grain-based outer coating and about 50 wt. % nut butter inner core. In certain embodiments, the bite-sized snacks comprise about 30 wt. % grain-based outer coating and about 70 wt. % nut butter inner core.

In certain embodiments, the equivalent spherical diameter volume ("ESV", defined below) of the bite-sized snacks is from about 0.5 $cm^3$ to about 14.1 $cm^3$ each, including from about 0.7 $cm^3$ to about 14 $cm^3$, including from about 1 $cm^3$ to about 13 $cm^3$, including from about 1.5 $cm^3$ to about 12 $cm^3$, including from about 2 $cm^3$ to about 11 $cm^3$, including from about 2.5 $cm^3$ to about 10 $cm^3$, including from about 3 $cm^3$ to about 9 $cm^3$, including from about 3.5 $cm^3$ to about 8 $cm^3$, including from about 4 $cm^3$ to about 7.5 $cm^3$, including from about 4.5 $cm^3$ to about 7 $cm^3$, including from about 5 $cm^3$ to about 7 $cm^3$, including from about 5 $cm^3$ to about 6.5 $cm^3$, including from about 5.5 $cm^3$ to about 7 $cm^3$, including from about 5.5 $cm^3$ to about 6 $cm^3$, including from about 6 $cm^3$ to about 7 $cm^3$, and including from about 6.5 $cm^3$ to about 7 $cm^3$, each in equivalent spherical diameter volume.

In certain embodiments, the equivalent spherical diameter of the bite-sized snacks ("ESD", defined below) is from about 1 cm to about 3 cm each, including from about 1.1 cm to about 2.9 cm, including from about 1.2 cm to about 2.9 cm, including from about 1.3 cm to about 2.8 cm, including from about 1.4 cm to about 2.7 cm, including from about 1.5 cm to about 2.6 cm, including from about 1.6 cm to about 2.5 cm, including from about 1.7 cm to about 2.4 cm, including from about 1.8 cm to about 2.4 cm, including from about 1.8 cm to about 2.3 cm, including from about 1.9 cm to about 2.4 cm, including from about 1.9 cm to about 2.2 cm, including from about 2.0 cm to about 2.4 cm, including from about 2.0 cm to about 2.1 cm, including from about 2.1 cm to about 2.4 cm, including from about 2.2 cm to about 2.3 cm, and including from about 2.3 cm to about 2.4 cm each in equivalent spherical diameter.

In certain embodiments, the bite-sized snacks have a weight of from about 2 g to about 20 g each, including from about 2.5 g to about 15 g, including from about 3 g to about 12.5 g, including from about 3.5 g to about 10 g, including from about 4 g to about 8 g, including from about 4.5 g to about 7 g, including from about 5 g to about 8 g, including from about 5 g to about 6.5 g, including from about 5.5 g to about 7.5 g, including from about 5.5 g to about 7 g, including from about 5.5 g to about 6 g, including from about 6 g to about 7 g, and including from about 6 g to about 6.5 g each.

Another aspect of the invention is to provide a package containing a plurality of bite-sized snacks, each bite-sized snack having an equivalent spherical diameter of about 1-3 cm. Each bite-sized snack comprises a soft inner core, comprising a nut butter and a stabilizer, and a crunchy grain-based outer coating covering at least a portion of the outer surface of the nut butter inner core. When measured by a texture profile analyzer instrument fitted with a crunchiness fixture at a penetration velocity of about 1 mm/s to a depth of about 9 mm, each bite-sized snack in the package exhibits an average peak force in the range of about 1000 g-3,500 g and an average positive area in the range of about 3000 g*s-10,000 g*s. Furthermore, even after 4 weeks of aging at various temperatures (70, 90, 100 and 120° F.), the plurality of bite sized snacks continue to exhibit a soft texture by having an average peak force in the range of about 800 g-5,000 g and an average positive area in the range of about 2,000 g*s-15,000 g*s as measured by a texture profile analyzer instrument fitted with a 10 kg load cell and a 1.1 inch diameter crunchiness fixture, and operated at a trigger force of 5 g, a test speed of 1 mm/s and a distance of 9 mm.

The plurality of bite-sized snacks in the inventive package each comprise a nut butter inner core and a grain-based outer coating as described above. The plurality of bite-sized snacks are prepared as described above, and each bite-sized snack has a size, shape, weight, equivalent spherical volume ("ESV" defined below), and equivalent spherical diameter ("ESD" defined below).

In certain embodiments, the average weight ratio of grain-based outer coating to nut butter inner core for the plurality of bite-sized snacks in the inventive package ranges from about 65:35 to about 35:65, including from about 60:40 to about 40:60, including about 55:45 to about 45:55, and including about 50:50, all ratios being wt./wt. In certain embodiments, the plurality of bite-sized snacks in the inventive package comprise an average of about 70 wt. % grain-based outer coating and about 30 wt. % nut butter inner core. In certain embodiments, the plurality of bite-sized snacks in the inventive package comprise an average of about 50 wt. % grain-based outer coating and about 50 wt. % nut butter inner core. In certain embodiments, the plurality of bite-sized snacks in the inventive package comprise about 30 wt. % grain-based outer coating and about 70 wt. % nut butter inner core.

The package contains a plurality of bite-sized snacks where the equivalent spherical volumes ("ESV" defined below) of each bite-sized snack in the plurality of bite-sized snacks is distributed over a range of from about 0.5 cm$^3$ to about 14.1 cm$^3$ each, including from about 0.7 cm$^3$ to about 14 cm$^3$, including from about 1 cm$^3$ to about 13 cm$^3$, including from about 1.5 cm$^3$ to about 12 cm$^3$, including from about 2 cm$^3$ to about 11 cm$^3$, including from about 2.5 cm$^3$ to about 10 cm$^3$, including from about 3 cm$^3$ to about 9 cm$^3$, including from about 3.5 cm$^3$ to about 8 cm$^3$, including from about 4 cm$^3$ to about 7.5 cm$^3$, including from about 4.5 cm$^3$ to about 7 cm$^3$, including from about 5 cm$^3$ to about 7 cm$^3$, including from about 5 cm$^3$ to about 6.5 cm$^3$, including from about 5.5 cm$^3$ to about 7 cm$^3$, including from about 5.5 cm$^3$ to about 6 cm$^3$, including from about 6 cm$^3$ to about 7 cm$^3$, and including from about 6.5 cm$^3$ to about 7 cm$^3$ each in equivalent spherical volume. In some exemplary embodiments, the package contains a plurality of bite-sized snacks where the equivalent spherical volumes are distributed over a range of from about 3.5 cm$^3$ to about 11 cm$^3$, and preferably from about 4.5 cm$^3$ to about 7 cm$^3$.

Because of the variability in the sizes of the bite-sized snacks, for a given package containing a plurality of the bite-sized snacks, the mean of the distribution range for the ESVs may be 6.2 cm$^3$, the median of the distribution range may be 6.0 cm$^3$, and the mode of the distribution range may be 7.0 cm$^3$. For other given packages containing a plurality of the bite-sized snacks, the mean of the distribution range for the ESVs may be 6.1 cm$^3$, the median of the distribution range may be 5.5 cm$^3$, and the mode of the distribution range may be 5.0 cm$^3$. For yet other given packages containing a plurality of the bite-sized snacks, the mean of the distribution range for the ESVs may be 5.5 cm$^3$, the median of the distribution range may be 4.7 cm$^3$, and the mode of the distribution range may be 4.4 cm$^3$. For other given packages containing a plurality of the bite-sized snacks, the mean of the distribution range may be about 4 cm$^3$, 5 cm$^3$, 6 cm$^3$, 7 cm$^3$, 8 cm$^3$, 9 cm$^3$, or 10 cm$^3$. For other given packages containing a plurality of the bite-sized snacks, the median of the distribution range may be about 4 cm$^3$, 5 cm$^3$, 6 cm$^3$, 7 cm$^3$, 8 cm$^3$, 9 cm$^3$, or 10 cm$^3$. For other given packages containing a plurality of the bite-sized snacks, the mode of the distribution range may be about 4 cm$^3$, 5 cm$^3$, 6 cm$^3$, 7 cm$^3$, 8 cm$^3$, 9 cm$^3$, or 10 cm$^3$.

The package contains a plurality of bite-sized snacks where the equivalent spherical diameters ("ESD" defined below) of each bite-sized snack in the plurality of bite-sized snacks is distributed over a range of from about 1 cm to about 3 cm each, including from about 1.1 cm to about 2.9 cm, including from about 1.2 cm to about 2.9 cm, including from about 1.3 cm to about 2.8 cm, including from about 1.4 cm to about 2.7 cm, including from about 1.5 cm to about 2.6 cm, including from about 1.6 cm to about 2.5 cm, including from about 1.7 cm to about 2.4 cm, including from about 1.8 cm to about 2.4 cm, including from about 1.9 cm to about 2.4 cm, including from about 1.9 cm to about 2.7 cm, including from about 2.0 cm to about 2.4 cm, including from about 2.0 cm to about 2.1 cm, including from about 2.1 cm to about 2.4 cm, including from about 2.2 cm to about 2.4 cm, including from about 2.2 cm to about 2.3 cm, and including from about 2.3 cm to about 2.4 cm each. In some exemplary embodiments, the package contains a plurality of bite-sized snacks where the equivalent spherical diameters are distributed over a range of from about 2.05 cm to about 2.37 cm.

Because of the variability in the sizes of the bite-sized snacks, for a given package containing a plurality of the bite-sized snacks, the mean of the distribution range for the ESDs may be 2.27 cm, the median of the distribution range may be 2.25 cm, and the mode of the distribution range may be 2.38 cm. For other given packages containing a plurality of the bite-sized snacks, the mean of the distribution range may be 2.1 cm, 2.2 cm, 2.3 cm, 2.4 cm, 2.5 cm, or 2.6 cm. For other given packages containing a plurality of the bite-sized snacks, the median of the distribution range may be 2.1 cm, 2.2 cm, 2.3 cm, 2.4 cm, or 2.5 cm. For other given packages containing a plurality of the bite-sized snacks, the mode of the distribution range may be 2.2 cm, 2.3 cm, 2.4 cm, 2.5 cm, or 2.6 cm.

The package contains a plurality of bite-sized snacks where the weight of each of the plurality of bite-sized snacks are distributed over a range of about 2 g to about 20 grams each, including from about 2.5 g to about 15 g, including from about 3 g to about 12.5 g, including from about 3.5 g to about 10 g, including from about 4 g to about 8 g, including from about 4 g to about 7 g, including from about 5 g to about 8 g, including from about 5.5 g to about 7.5 g, including from about 5.5 g to about 7 g, including from about 6 g to about 7 g, and including from about 6 g to about 6.5 g each. In some exemplary embodiments, the plurality of bite-sized snacks range in weight from about 2 g to about 20 g each. In some exemplary embodiments, the plurality of bite-sized snacks range in weight from about 3 g to about 12.5 g each.

Texture and Mouthfeel

A major challenge facing food developers is how to accurately and objectively measure texture and mouthfeel. Texture is a composite property related to a number of physical properties and the relationship is complex. Nonetheless, it is generally recognized that the textural characteristics of food can be divided into mechanical and geometrical properties (those related to size, shape and orientation of particles). However, mouthfeel is more difficult to define because it involves a food's entire physical and chemical interaction in the mouth—from initial perception on the palate, to first bite, through mastication and finally, the act of swallowing. Therefore, describing texture and mouthfeel in a single value obtained from an instrument is impossible.

Texture Analysis

While clearly the mechanical properties exhibited by a food are important when a person consumes it, accurately measuring just how much these properties contribute to overall enjoyment of the food can be hard because of the subtle interplay texture has with mouthfeel and other organoleptic factors like flavor. However, those skilled in the art have identified five primary parameters (hardness, cohesiveness, viscosity, elasticity and adhesiveness) and three secondary parameters (brittleness, chewiness and gumminess) which are associated with the mechanical properties and there is a need for reproducible techniques to measure these parameters.

To address this need, texture analyzers have been developed to evaluate some of these individual mechanical properties that contribute to the consumer experience. As mentioned, texture analyzers can be used to perform analytical tests for determining certain industry-accepted textural properties, including softness, hardness, chewiness, toughness, brittleness, crunchiness, crispiness, etc. More specifically, particular industry-accepted texture analysis test methods pertaining to the present invention are described as follows.

Figure 2A:
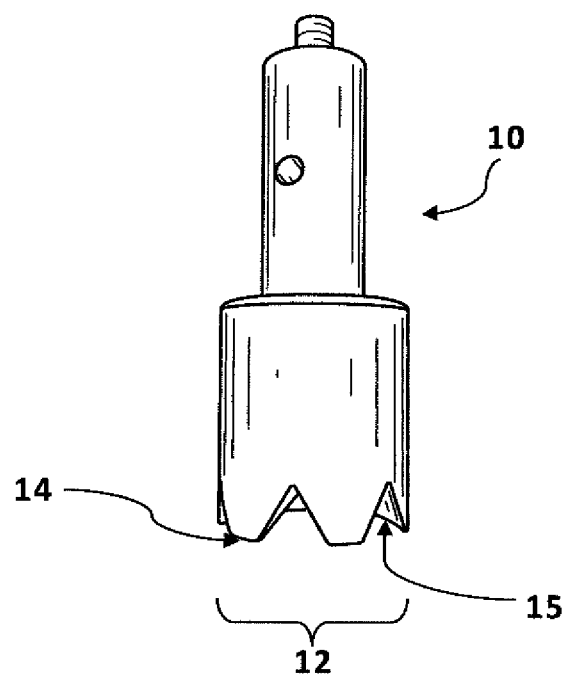
FIGS. 2A and 2B are illustrations of the crunchiness fixture used in the texture analysis.
Figure 2B:
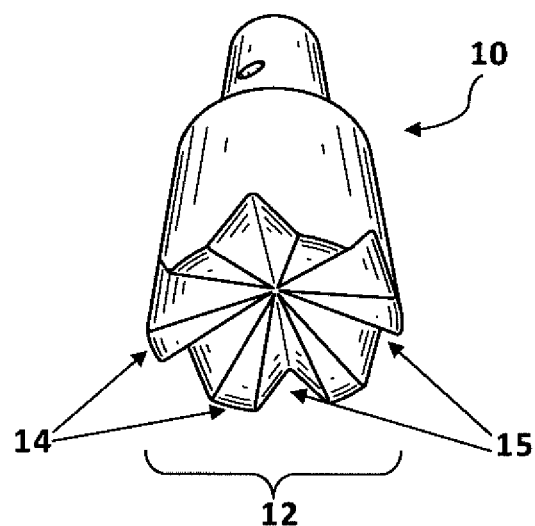
Figure 3A:
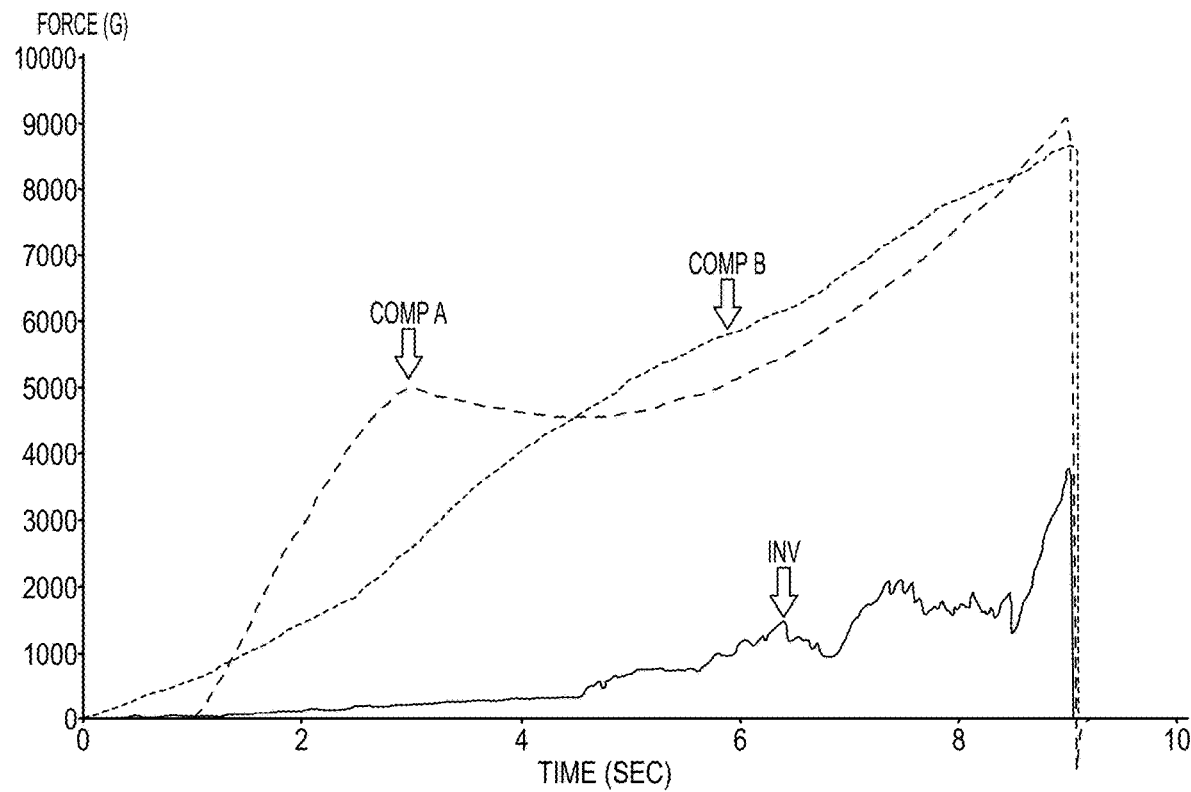
FIGS. 3A, 3B, 3C, 3D, and 3E are plots of texture analysis curves for the inventive and comparative samples at time 0, and after 4-weeks aging at 70, 90, 100, and 120° F.
Figure 3B:
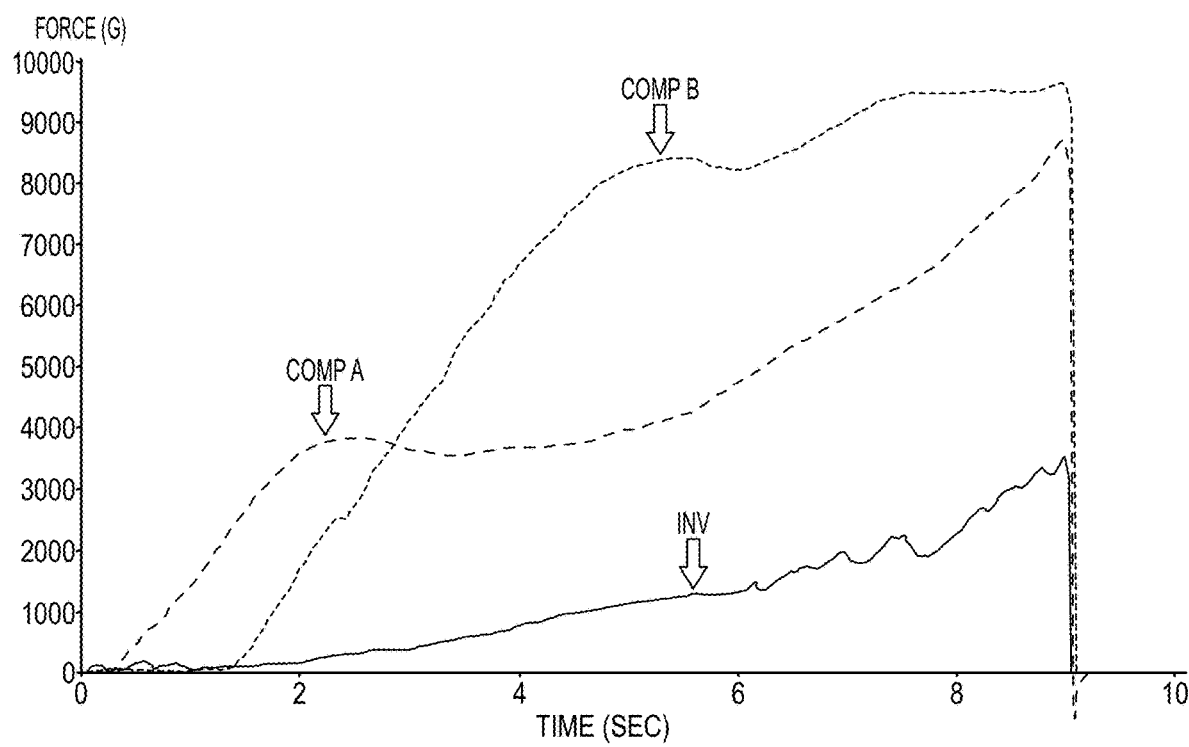
Figure 3C:
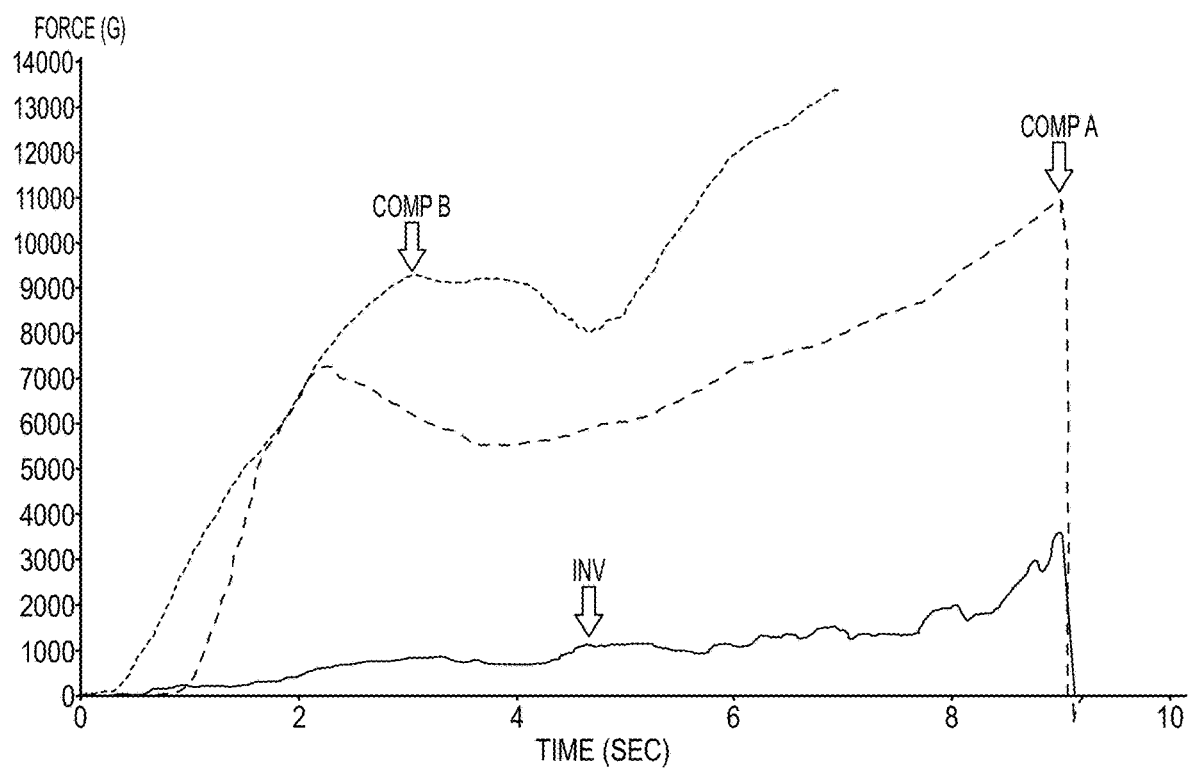
Figure 3D:
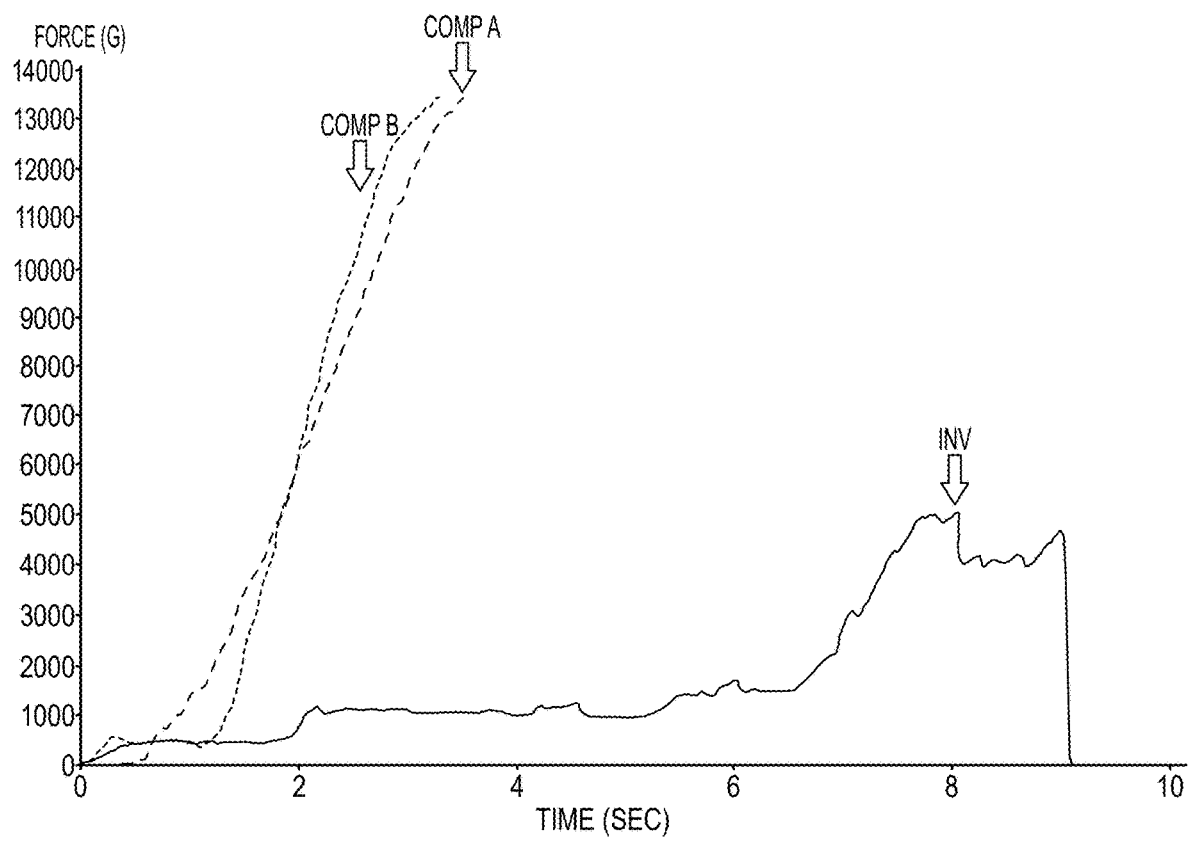
Figure 3E:
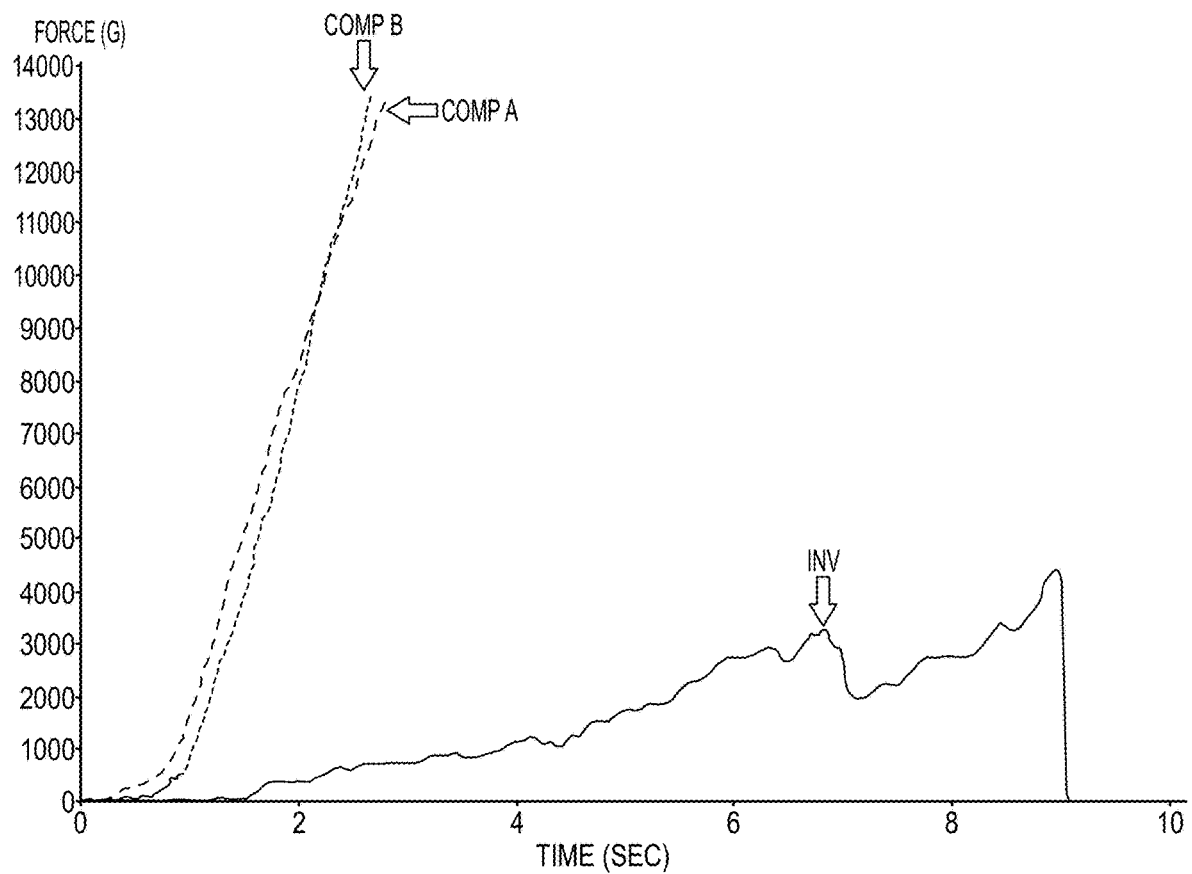

For the purpose of this disclosure, texture analysis measurements determine the resistance of a test sample to a compressive force, simulating the texture experienced by a person biting into the test sample. This test uses a "crunchiness" fixture 10, as shown in FIGS. 2A and 2B, as a testing probe. The crunchiness fixture simulates the relatively large surface area 12 and uneven topography (i.e., "ridges" 14 and "valleys" 15) of the biting surface of a human tooth, specifically a molar. An exemplary crunchiness fixture is the 1.1 inch diameter probe from the set TA-25C for the TA.XTplus Texture Analyzer (Stable Micro Systems, Ltd, Godalming, Surrey, U.K.). The crunchiness fixture is mounted on a texture analyzer, such as a TA.XTplus Texture Analyzer, and a representative test sample is positioned in the texture analyzer. During the measurement, the crunchiness fixture is pressed into the test sample for a controlled distance (mm) into the sample at a controlled rate (mm/sec). The force exerted by the crunchiness fixture is measured, and the results are plotted as applied force versus time curve. From this curve, various texture properties can be determined, including peak force, positive area, and crunchiness. FIGS. 3A, 4, 5A and 5B illustrate the texture analysis curves from various samples at time zero or samples at the start of the aging study.

Peak Force

The peak force is the maximum force applied to the sample during the test. Generally, the higher the peak force measurement, the harder the sample is; conversely, the lower the peak force measurement, the softer the sample is. Peak force may be measured when the measurement probe (i.e., crunchiness fixture) reaches maximum penetration.

For very hard or very brittle test samples, the peak force may be reached before the crunchiness fixture reaches the maximum penetration. For these test samples, a brittle test sample may shatter from the applied force when the crunchiness fixture is at or near the upper surface of the test sample. Alternatively, a hard test sample may resist the applied force until the texture analyzer reaches its maximum applied load, at which point the texture analyzer automatically aborts the test.

Figure 4:
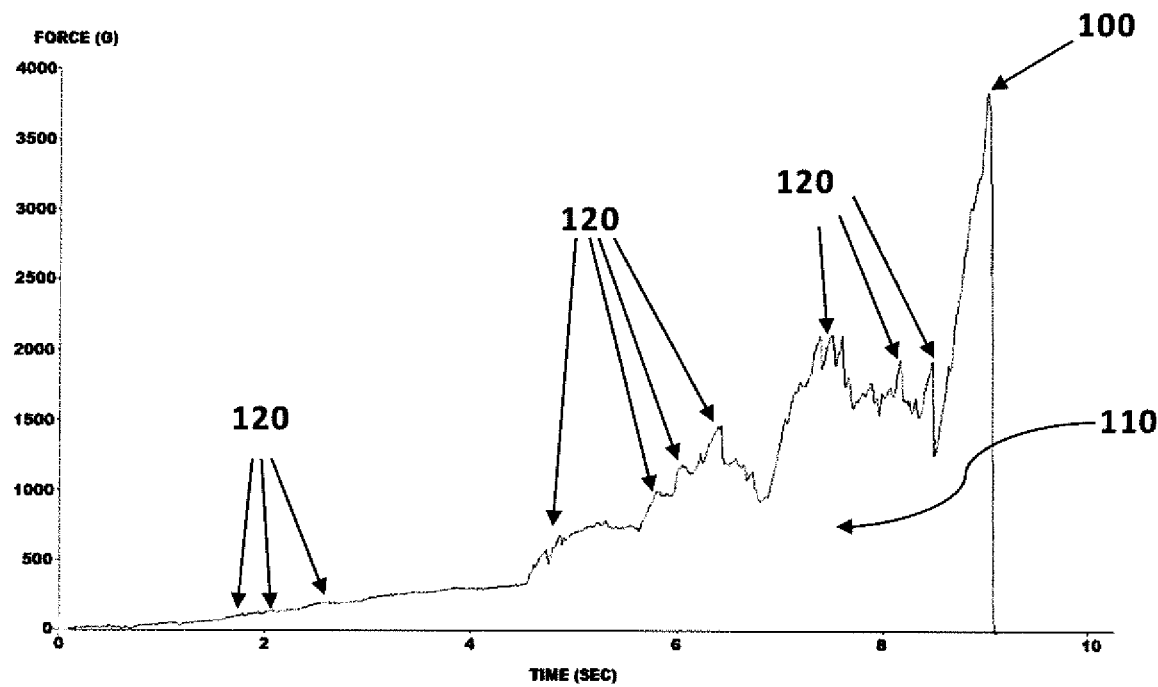
FIG. 4 is a texture analysis curve for the inventive bite-sized snack.
Figure 5A:
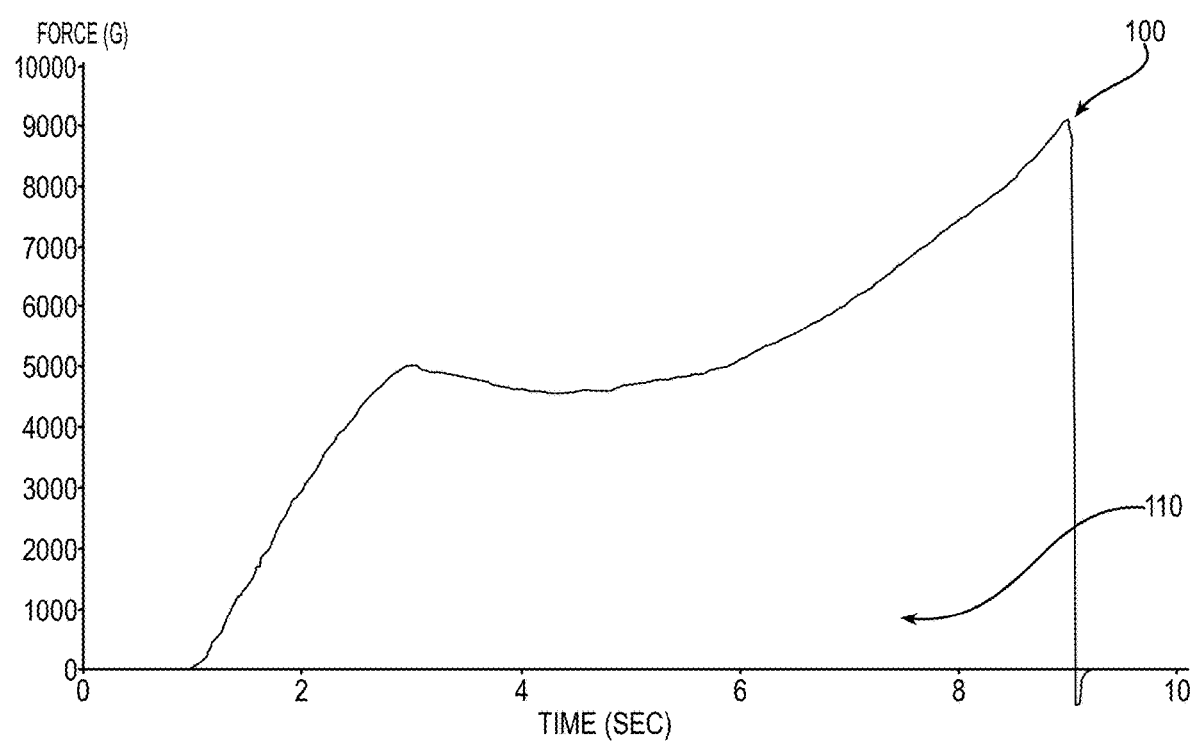
FIG. 5A is a texture analysis curve for comparative sample COMP A.
Figure 5B:
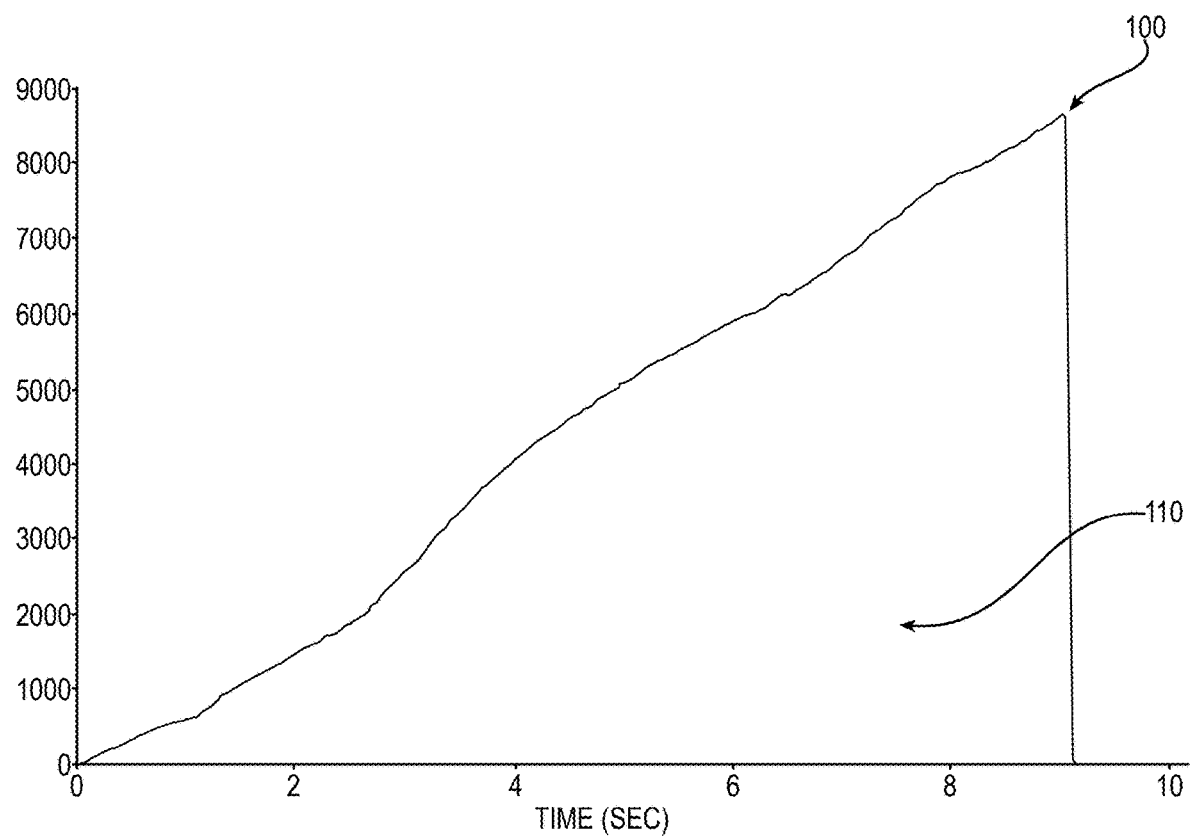
FIG. 5B is a texture analysis curve for comparative sample COMP B.
Figure 6A:
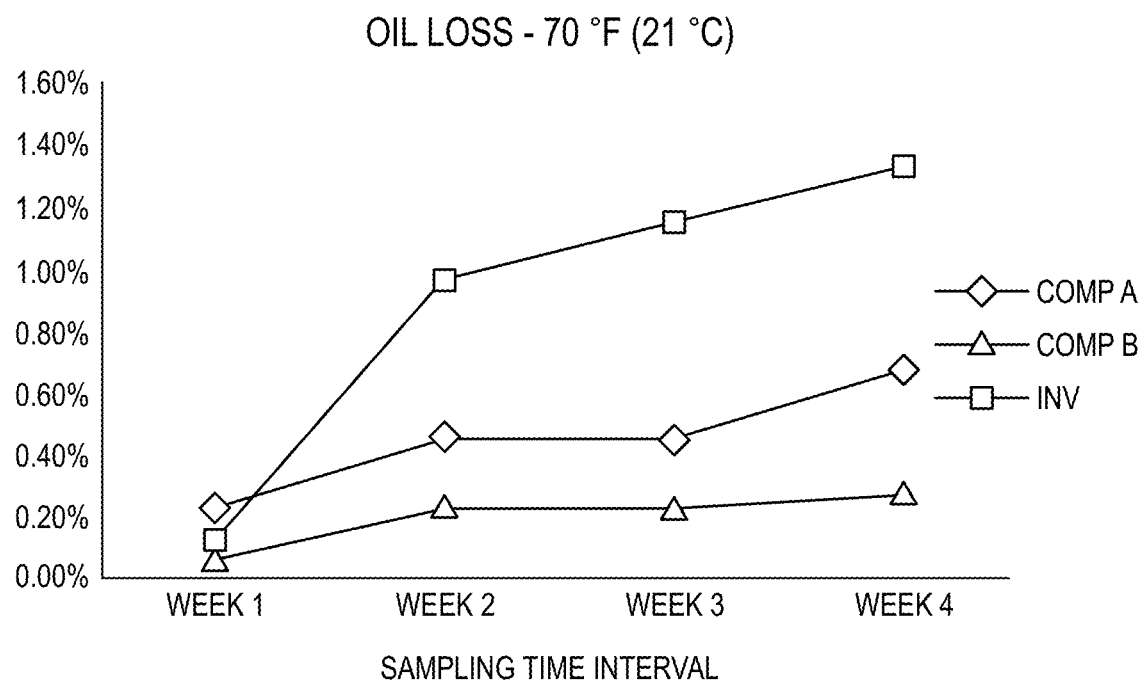
FIGS. 6A, 6B, 6C, and 6D are graphs showing the average oil loss over a 4-week testing period at 70, 90, 100 and 120° F. for the inventive bite-sized snack, comparative sample COMP A, and comparative sample COMP B.
Figure 6B:
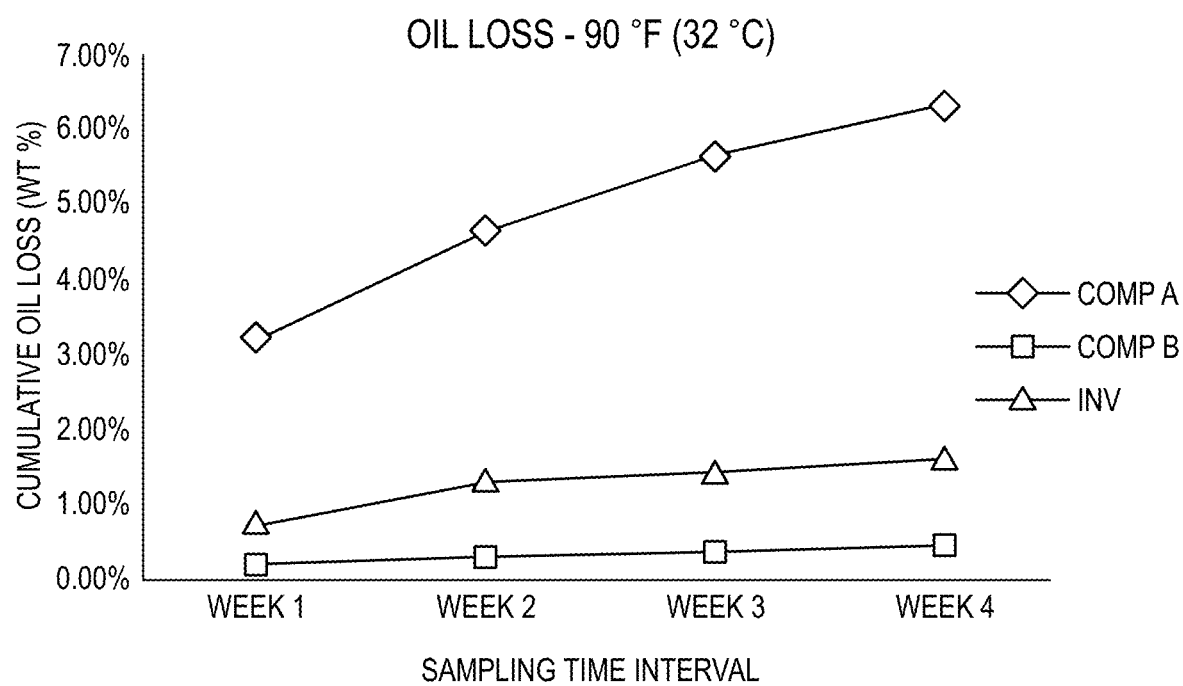
Figure 6C:
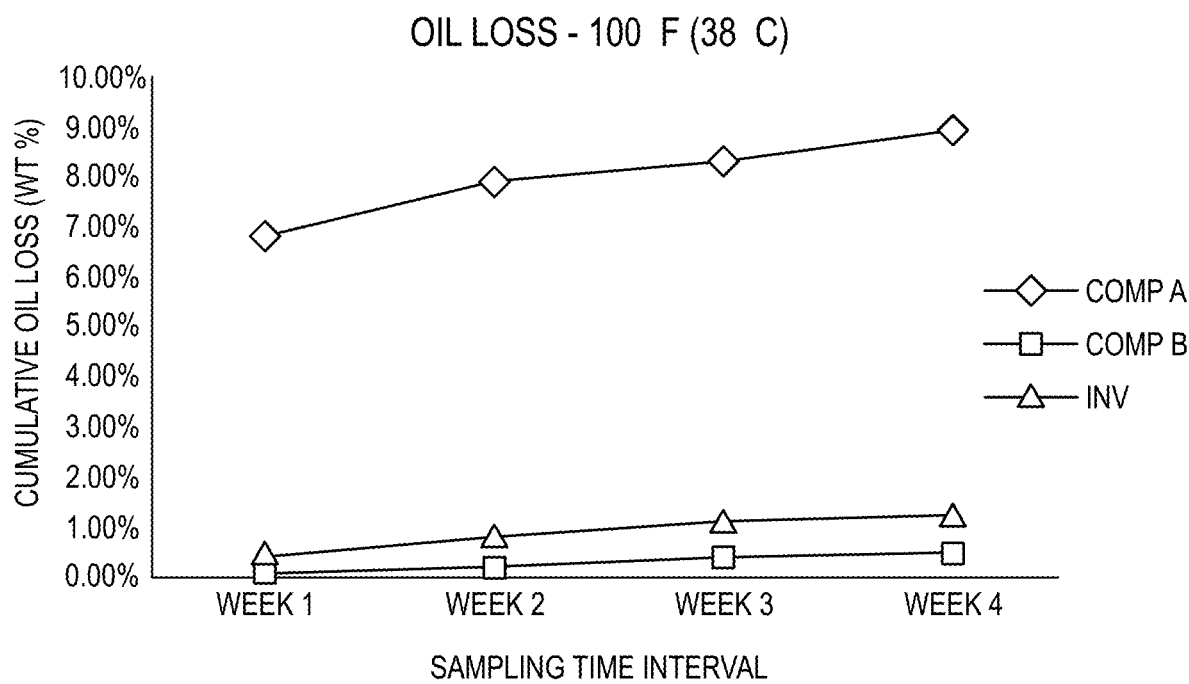
Figure 6D:
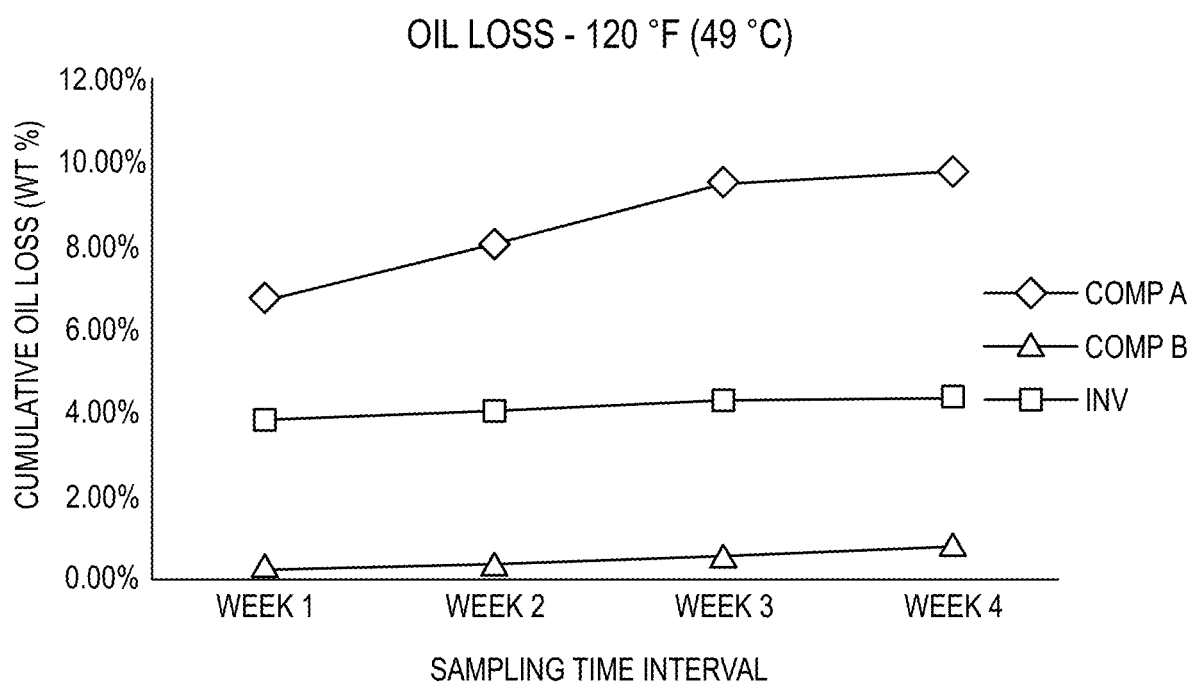
Figure 7A:
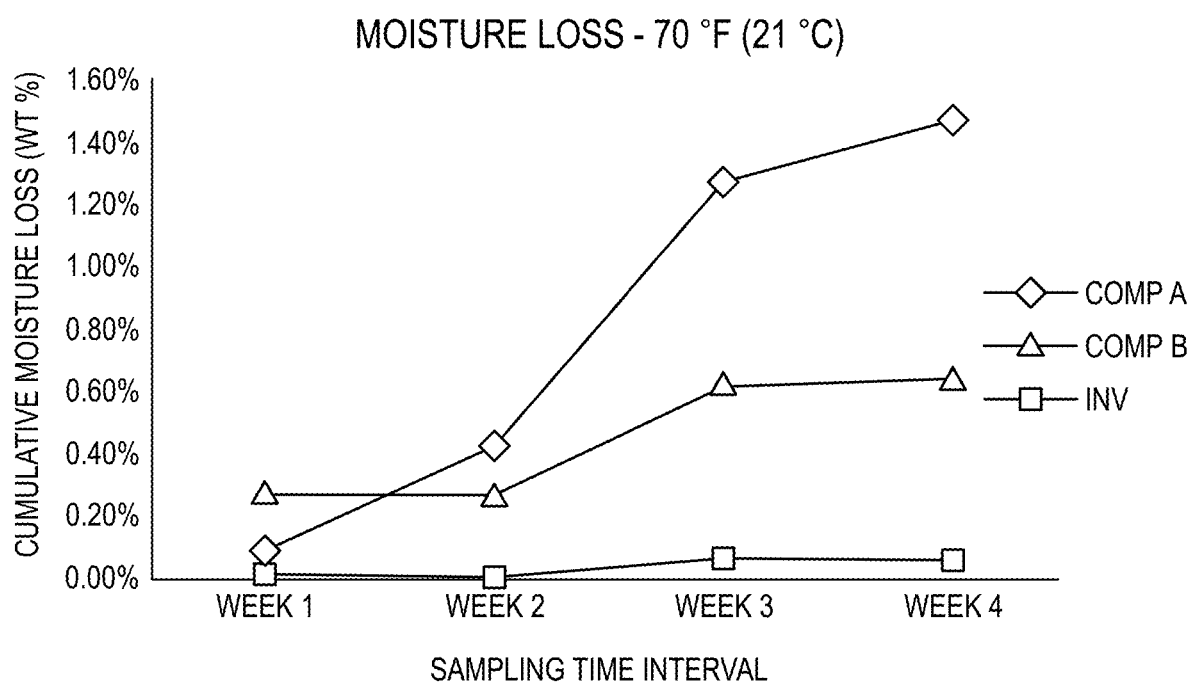
FIGS. 7A, 7B, 7C, and 7D are graphs showing the average moisture loss over a 4-week testing period at 70, 90, 100 and 120° F. for the inventive bite-sized snack, comparative sample COMP A, and comparative sample COMP B.
Figure 7B:
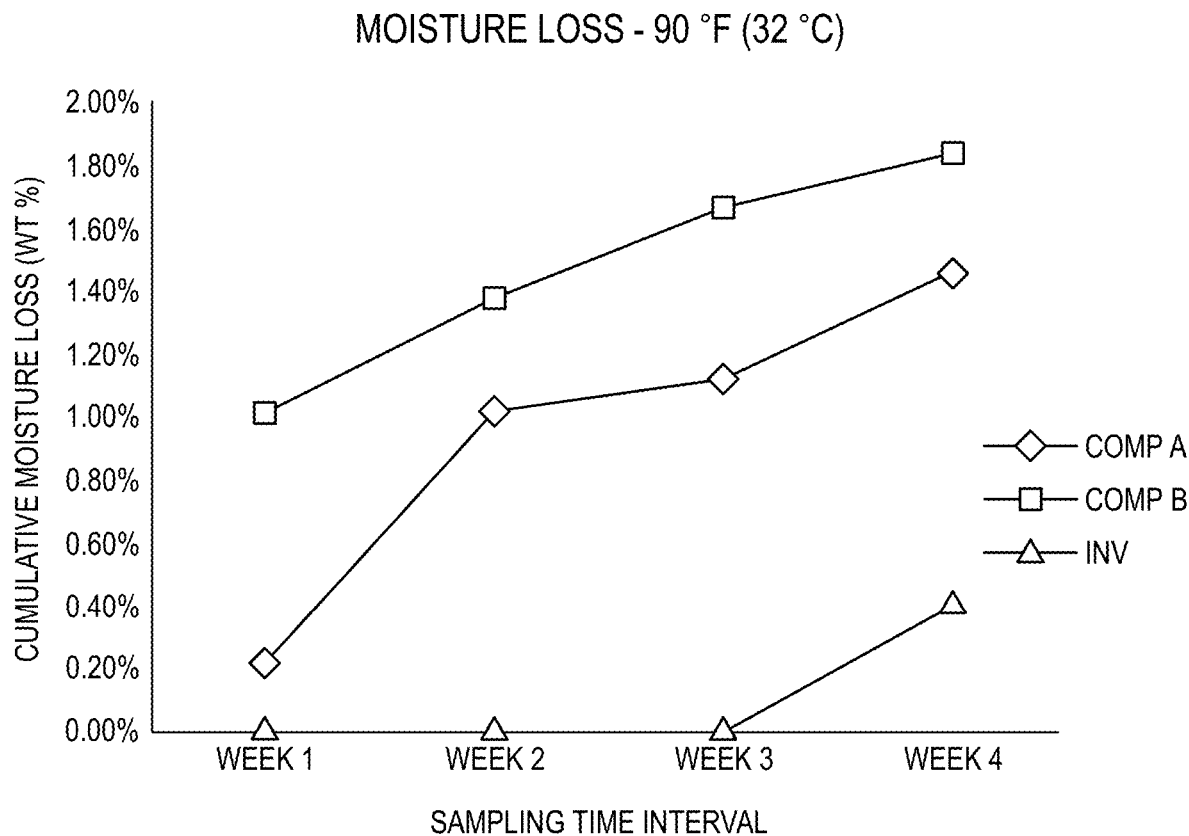
Figure 7C:
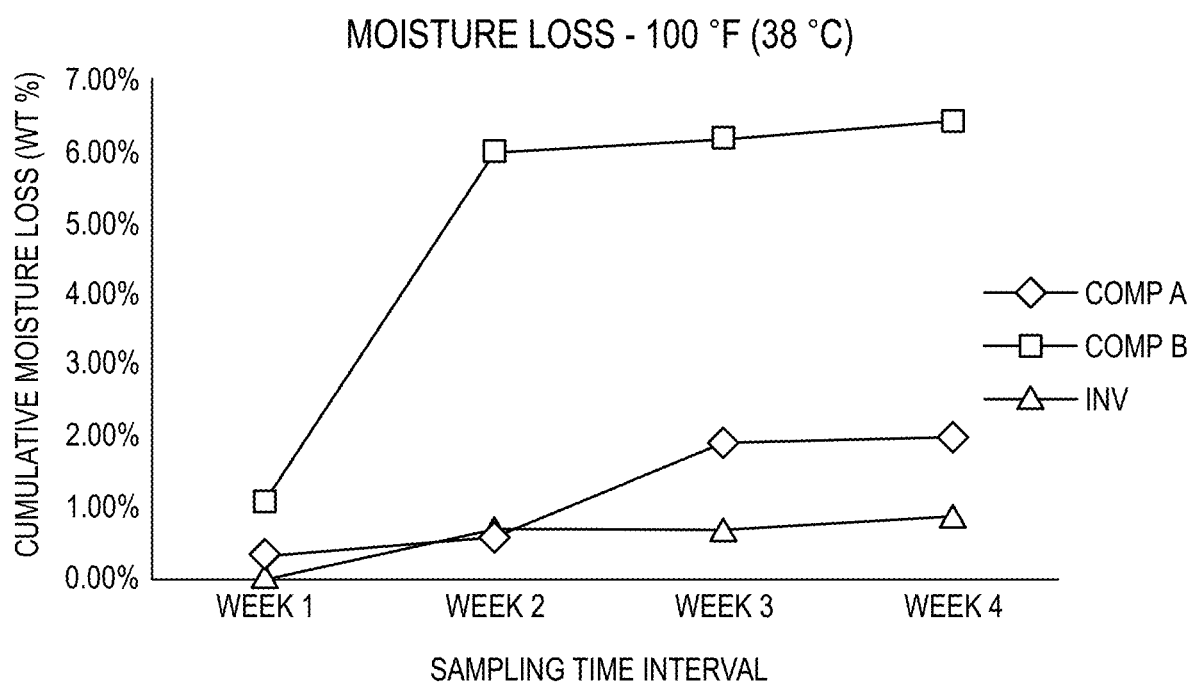
Figure 7D:
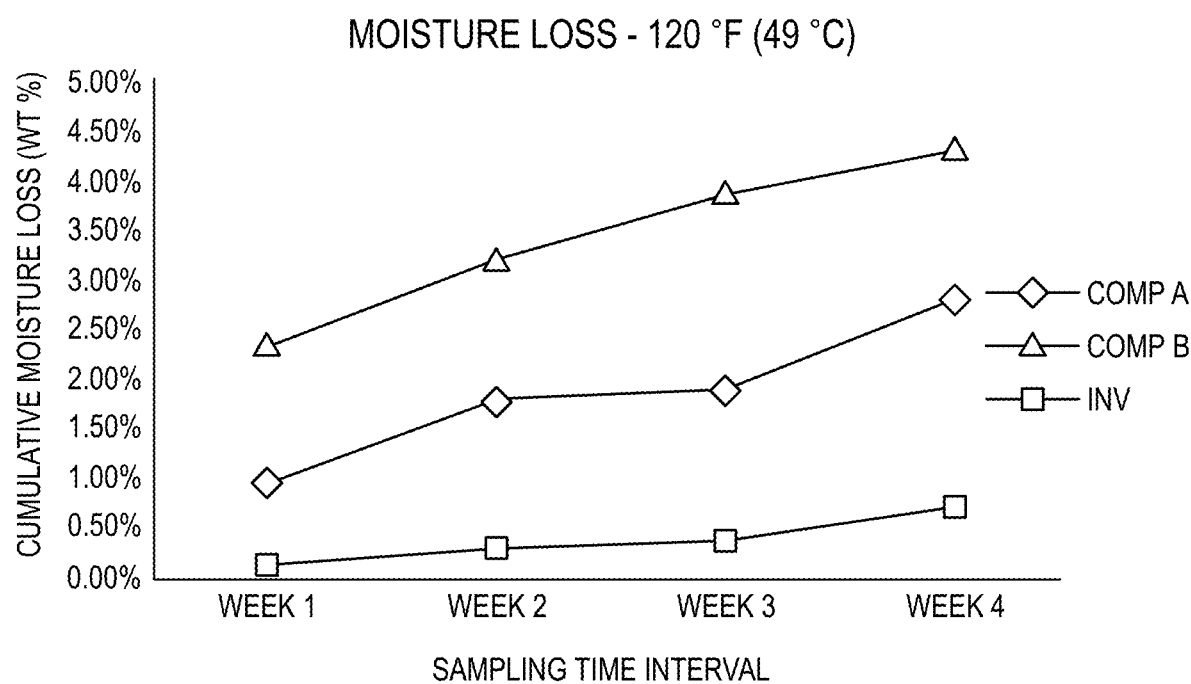
Figure 8A:
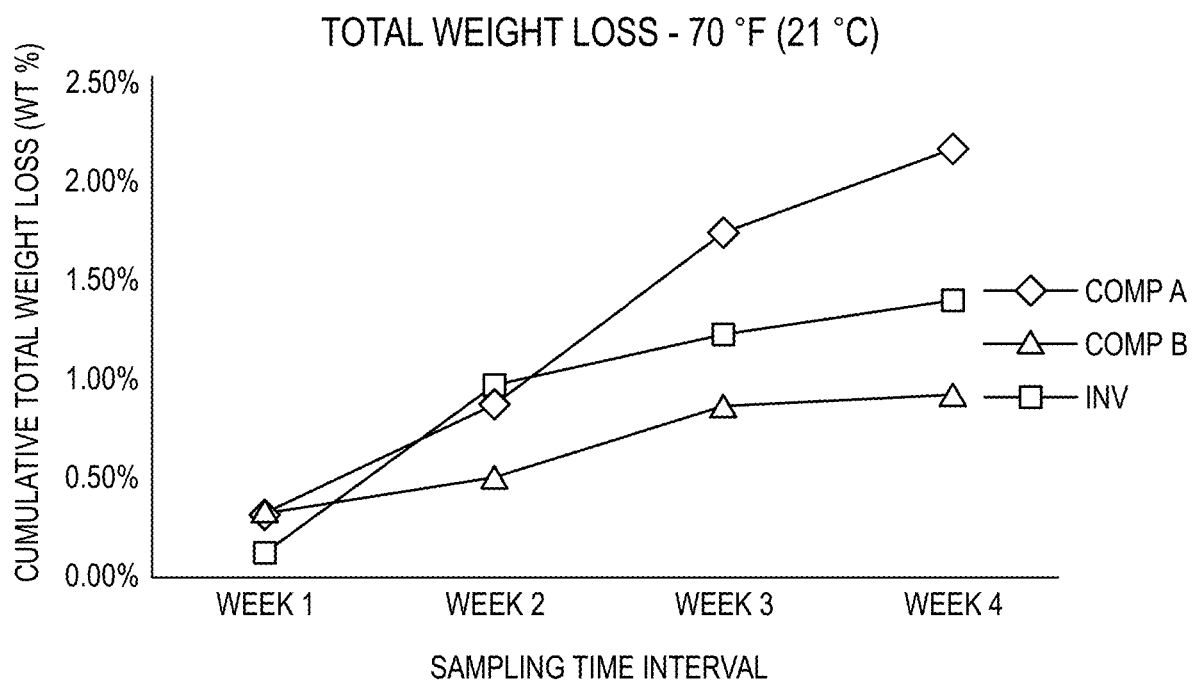
FIGS. 8A, 8B, 8C, and 8D are graphs showing the average total weight loss over a 4-week testing period at 70, 90, 100 and 120° F. for the inventive bite-sized snack, comparative sample COMP A, and comparative sample COMP B.
Figure 8B:
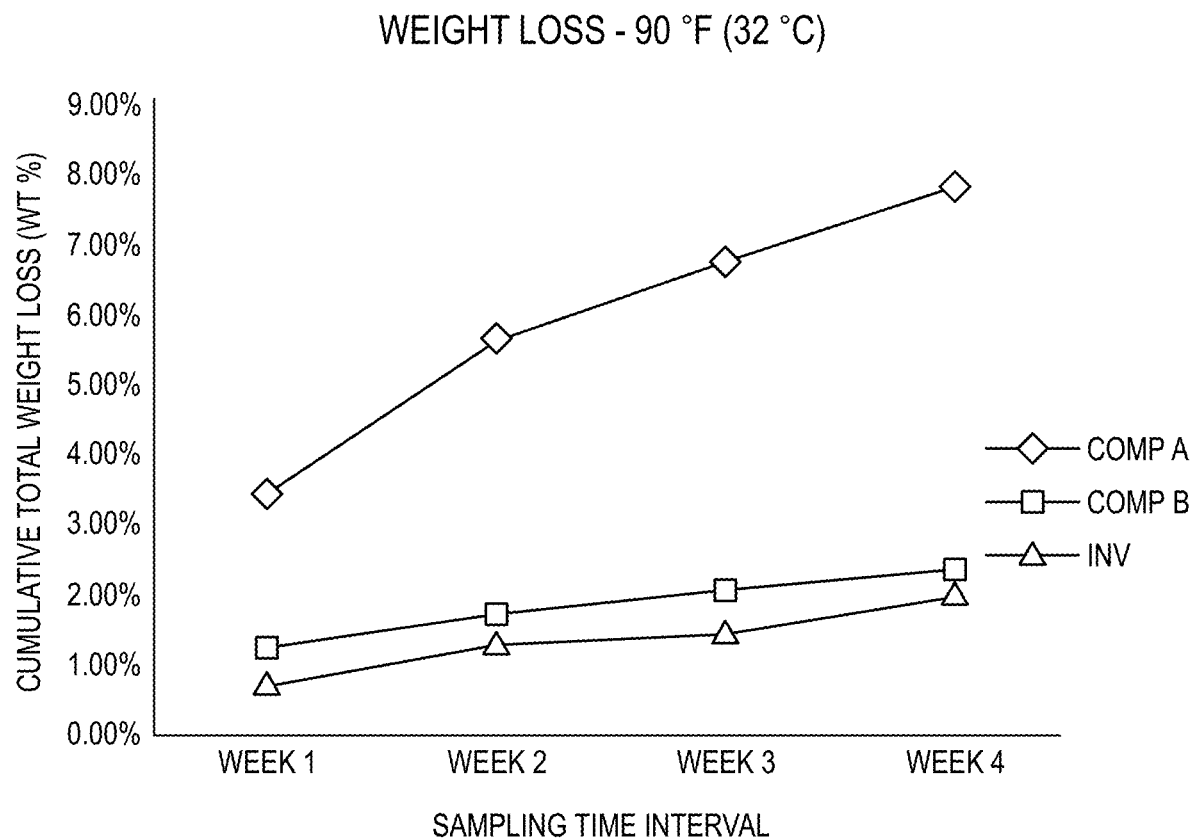
Figure 8C:
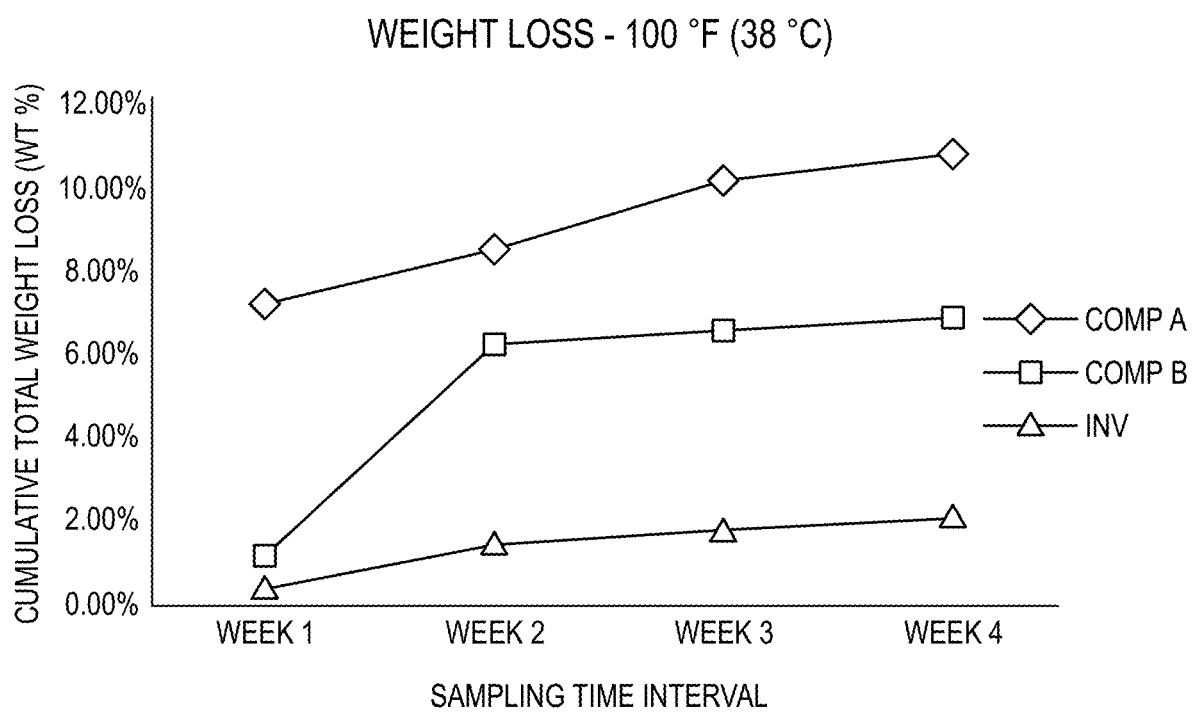
Figure 8D:
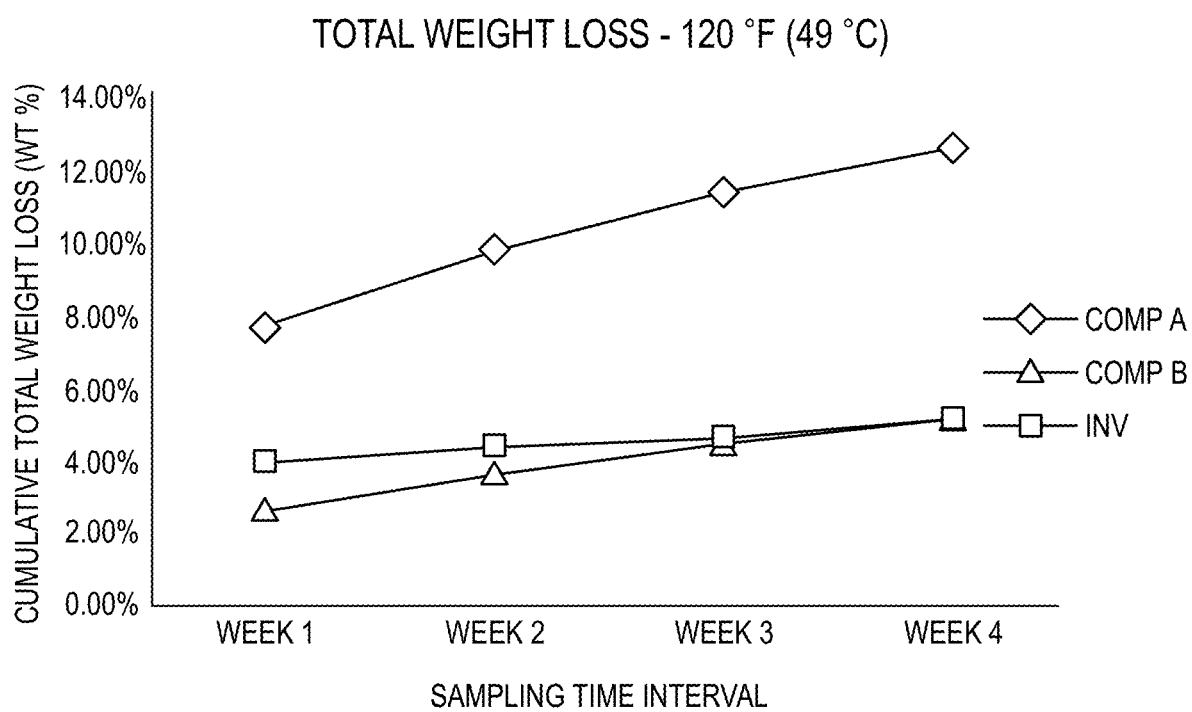

However, for most of the samples tested herein, the peak force occurs at the end of the test, when the crunchiness fixture reaches the maximum penetration of the sample. FIG. 4 illustrates a texture analysis results curve for a bite-sized snack according to the present disclosure, and FIGS. 5A and 5B illustrate the texture analysis curves for two comparative samples. In FIGS. 4 through 5B, the peak force measurement occurs at the point 100.

Positive Area

Positive area is the area under the texture analysis results curve. Positive area measures the work of compression that occurs when the measurement probe (i.e., crunchiness fixture) is pressed into the sample. The larger the positive area, the more work of compression that is measured, and the harder the sample is. Conversely, the smaller the positive area, the less work of compression that is measured, and the softer the sample is. In FIGS. 4 through 5B, the area 110 under the texture analysis results curve is the positive area.

Crunchiness

Crunchiness is a measurement by the texture analyzer of how many times the applied force exerted during the texture analysis measurement briefly spikes, then drops, when testing a given sample. In simple terms, as a test probe (i.e., crunchiness fixture) presses into the test sample, the probe may encounter small resistant domains within the sample that briefly causes the applied force to increase. These resistant domains may be crunchy elements within the test sample (e.g., puffed grain crisps), surface coatings (e.g., candy shell, grain particles), layers with different textures (e.g., cookie layers interspersed with chocolate layers), or similar structures that provide short-term applied force resistance. As the probe encounters the resistant domain, the applied force briefly spikes. However, when the resistant domain fractures or shatters under the applied force of the probe, the applied force will quickly drop to roughly the applied force before encountering the resistant domain. Hence, each small applied force spike in the texture analysis results curve corresponds to the probe's encounter with a resistant domain. The greater number of spikes (i.e. peaks) measured in the curve (i.e., the number of peaks), the crunchier the test sample is perceived to be.

In FIG. 4, the force spikes (i.e., peaks) are indicated by arrows 120. Measurement noise is eliminated by counting only those peaks with a magnitude of at least 5 g. The sample crunchiness is measured by the total number of such peaks determined in each texture analysis results curve.

Stability of Peak Force, Positive Area and Crunchiness over Time/Temperature

Furthermore, measurements for the peak force, positive area, and crunchiness change over time. Unexpectedly, the inventive sample is both softer and crunchier than either of the comparative samples. FIGS. 3B, 3C, 3D, and 3E illustrate the texture analysis curves from various inventive and comparative samples after 4 weeks of aging at various temperatures (70, 90, 100 and 120° F.).

Mouthfeel

As previously mentioned, the mouthfeel associated with a food product can be difficult to define. However, it is generally recognized that certain characteristics such as moisture content, oiliness and greasiness of the food product substantially impact its overall mouthfeel. Therefore, it's important for food manufacturers to monitoring the loss of both oil and moisture from their food products over time.

Oil Loss, Moisture Loss, and Total Weight Loss

A food product containing nut butters retains its pleasing organoleptic properties and mouthfeel, such as a smooth and creamy texture, when both moisture and oil (from the nut butter) are not lost from the product during storage. Therefore, minimizing the long-term total weight loss (moisture loss, oil loss, etc.) from a food product containing a nut butter is important in maintaining the consumer's pleasant experience of chewing and tasting the product as the product ages.

Specifically, for snacks containing nut butter as a major ingredient, because of the high oil content present in nut butters the oil loss which is exhibited both during transport (which occurs after manufacture but prior to the point of purchase) as well as during storage (which occurs after the point of purchase but prior to actual consumption) can lead to significant problem for such nut-butter based snacks. Oil loss from a food product containing nut butter can damage or stain materials in contact with the food product, including the product packaging, the clothing of the consumer, or furnishings such as shelving, counter tops, and furniture. Oil loss can also impact the texture and taste of the stored food product containing nut butter, causing the nut butter to lose the smooth and creamy texture originally associated with the nut butter.

Also, the moisture loss that is exhibited during transport and storage for snacks containing nut butter as a major ingredient can likewise lead to significant problem for such nut-butter based snacks. As with oil loss, moisture loss from a food product containing nut butter can detrimentally impact the texture and taste of the stored food product containing nut butter, causing the nut butter to lose the smooth and creamy texture originally associated with the nut butter.

Food products such as the inventive bite-sized snacks can be tested over an extended period for the oil, moisture and overall total weight loss as the food product ages over time in order to generate a long-term aging profile for the product. Alternatively, the long-term aging profile for a product can be simulated by performing accelerated aging studies involving simultaneously measuring for oil loss, moisture loss, and total weight loss at a series of different elevated (i.e., above ambient) temperatures. Exemplary testing temperatures may include 70° F. (21° C.), 90° F. (32° C.), 100° F. (38° C.), and 120° F. (49° C.). For the inventive bite-sized snacks described herein, individual samples are tested for oil loss, moisture loss and total weight loss (i.e., moisture loss plus oil loss plus loss of volatiles, etc.) using standard gravimetric methods, while individual samples are tested for oil and moisture loss, as described below. For the oil loss, moisture loss, and total weight loss, the samples are stored at elevated temperatures for the test duration in order to simulate the long-term aging profile for the product.

Figure 10:
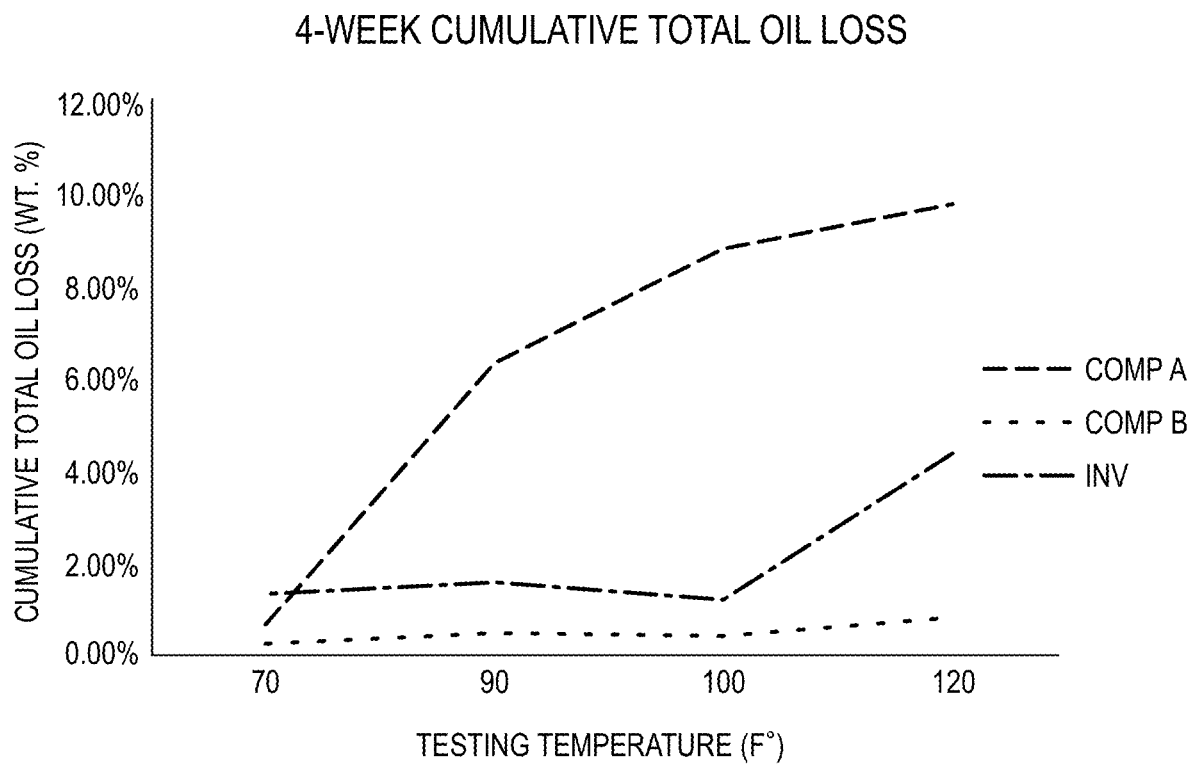
FIG. 10 is a graph showing the average cumulative oil loss after a 4-week aging study for the inventive bite-sized snack, comparative sample COMP A, and comparative sample COMP B.

One method of testing for oil loss is to place individual samples of the bite-sized snacks on a pre-weighed absorbent paper, such as a filter paper. Replicate samples are stored under controlled temperature conditions. At designated time intervals (e.g., weekly), the filter paper under each sample is weighed to measure the amount of oil absorbed by the filter paper and lost by the sample. A new piece of pre-weighed filter paper is placed under each sample after each measurement, to maximize fresh oil migration into the filter. For each sample, the sample's cumulative total weight loss and its cumulative oil loss over the course of the experiment is also monitored. The samples are also observed for shape deformation, such as spreading or melting. FIG. 10 illustrates embodiments in which the cumulative oil loss over a 4-week testing period at testing temperatures of 70, 90, 100, and 120° F. are plotted for samples of the present invention and the comparative samples.

Figure 11:
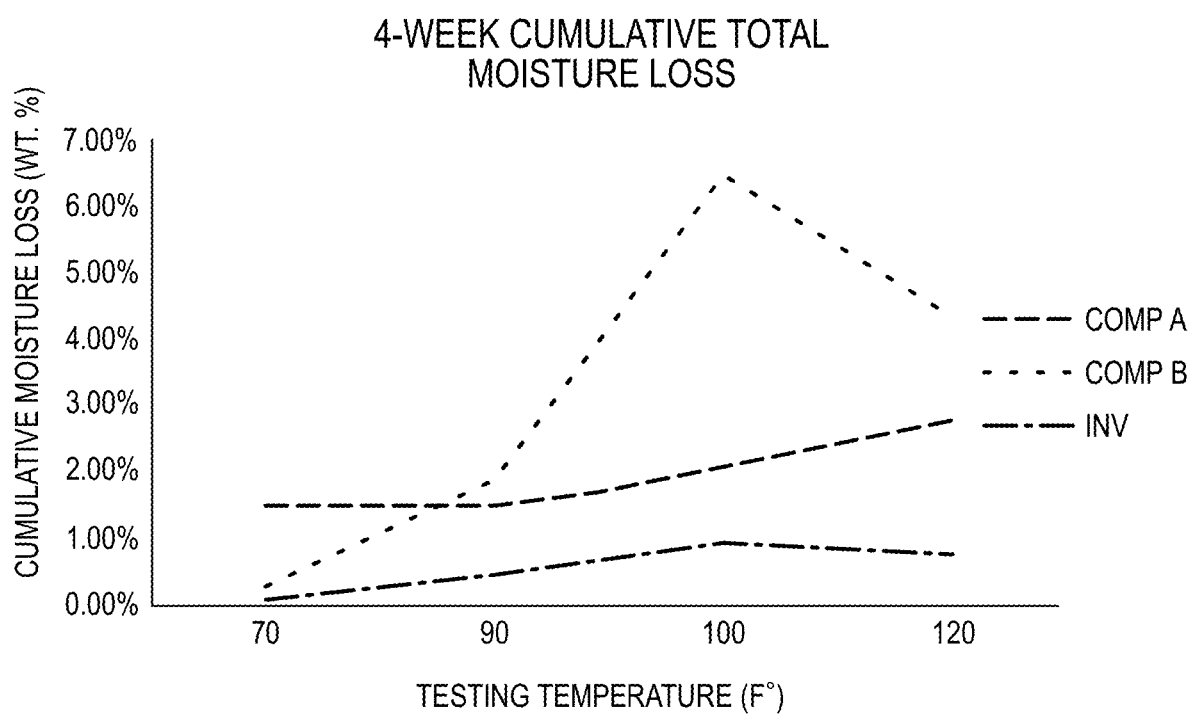
FIG. 11 is a graph showing the average cumulative moisture loss after a 4-week aging study for the inventive bite-sized snack, comparative sample COMP A, and comparative sample COMP B.

To determine the moisture loss of the individual samples of the bite-sized snacks, the total weight loss minus the oil loss was calculated to arrive at the moisture loss (i.e., total weight loss−oil loss=moisture loss). FIG. 11 illustrates embodiments in which the cumulative moisture loss over a 4-week testing period at testing temperatures of 70, 90, 100, and 120° F. are plotted for samples of the present invention and the comparative samples.

Figure 12:
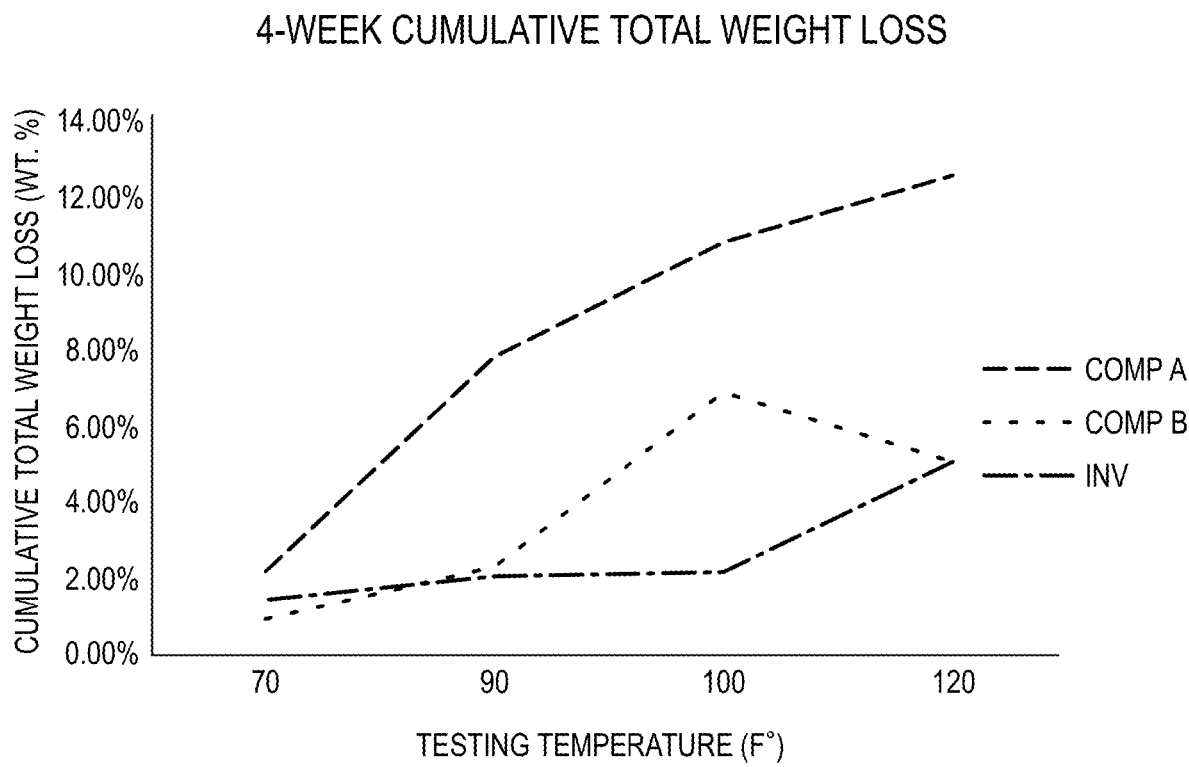
FIG. 12 is a graph showing the average cumulative total weight loss after a 4-week aging study for the inventive bite-sized snack, comparative sample COMP A, and comparative sample COMP B.

Total weight loss exhibited from the samples is measured as described. FIG. 12 illustrates embodiments in which the cumulative total weight loss over a 4-week testing period at testing temperatures of 70, 90, 100, and 120° F. are plotted for samples of the present invention and the comparative samples.

The graphs in FIGS. 11 and 12 demonstrates that the cumulative moisture loss and cumulative total weight loss of the inventive samples are lower compared to the cumulative moisture and cumulative total weight loss for either comparative sample.

When oil and moisture and overall total weight loss data is combined with both texture analysis measurements and geometrical properties data (such as the nut butter particle's fineness of grind size) and these data sets are correlated to physical sensations known to be relevant to the consumer's eating experience (backward smells, effect on mouth temperature and pressure on the tongue, hearing perceived via sound conduction through the jawbone, etc.) insight is gained into mouthfeel characteristics that may otherwise be difficult to measure (e.g., the perception of "smooth and creamy"). What also impacts whether a food is perceived to be smooth and creamy may be driven by the sensory contrast a consumer experiences when both hard and soft domains exist within an individual food product, and this is effected both by how different the two domains are in terms of hardness as well as the total number of hard and soft domains present overall.

Size Measurement

Equivalent Spherical Volume ("ESV")

Because of their irregular shape and surface texture, it can be difficult to classify the size of the inventive bite-sized snacks. One descriptor for quantifying the size of the bite-sized snack size is the equivalent spherical volume (the "ESV"). Put simply, the ESV is the volume of a sphere that has an equivalent volume to an irregularly-shaped object. The ESV may be determined directly, using the volumetric displacement method described below.

Equivalent Spherical Diameter ("ESD")

Another descriptor for quantifying the size of the bite-sized snack size is the equivalent spherical diameter (the "ESD"). Put simply, the ESD is the diameter of a sphere that has an equivalent volume to the irregularly-shaped object. The ESD may be determined by first determining the ESV directly, using the volumetric displacement method described below, and this information is used along with the equation provided below to calculate the ESD.

A volumetric displacement method was used to determine the equivalent spherical volume and the equivalent spherical diameter of the inventive bite-sized snacks. Peanut oil was placed into a 250 mL graduated cylinder, and the initial volume of peanut oil was noted. A single inventive bite-sized snack was carefully submerged into the peanut oil in the graduated cylinder, taking care to avoid air bubbles around the surface of the bite-sized snack or elsewhere in the peanut oil. The volume of peanut oil plus bite-sized snack was recorded, and the displacement volume (bite-sized snack only) was calculated. The displacement volume is equal to the equivalent spherical volume (ESV).

The ESD for a sphere of that volume is then calculated using the ESV in the following way. First the equivalent spherical radius (the "ESR") is calculated using equation (1). Then the ESD can then be calculated using equation (2):

$$ESR = \sqrt[3]{([3*ESV] \div 4\pi)} \quad (1)$$

$$ESD = 2*ESR \quad (2)$$

EXAMPLES

The following examples are intended to illustrate embodiments of the invention, but are not meant to be limiting thereof.

Inventive Samples

A batch of samples of the inventive bite-sized snacks, INV, was formed by mixing about 50 kg creamy peanut butter, about 2.5 kg peanut flour, about 1.5 kg fully-hydrogenated rapeseed oil to form a peanut butter to be used in the bite-sized snack inner cores. The peanut butter mixture was extruded as cylinders of approximately 16 mm length by 16 mm diameter. The cylindrical inner cores were coated with granola, using a drum tumbler. The granola mixture used for the tumble coating comprised rolled oats, sugar, puffed brown rice, nonfat dried milk, chopped almonds, molasses, and canola oil. The resulting bite-sized snacks comprised about 50 wt. % peanut butter inner core and 50 wt. % granola coating.

Comparative Samples

Commercially-available comparative examples were tested with the inventive samples made as described above. Skippy® P.B. Bites Double Peanut Butter ("COMP A") comprised a peanut butter-based inner core with a hardened peanut butter-based coating. GFB™ Gluten Free Bites pb+j ("COMP B") comprised an inner core made of a protein powder paste mixed with bits of fruit, seeds, and nuts and a binder (including either brown rice syrup, agave nectar or a mixture therefor, for example), rolled in a chopped peanut coating. FIG. 9 presents a table showing the nutritional composition of the inventive and comparative samples. The nutritional information is shown as a "per bite" value for each type of bite-sized snack, and also normalized to an equivalent weight of 100 g for each type of bite-sized snack. As can be seen, when compared on an equivalent weight basis, the inventive and comparative samples are similar in calories, fat, total carbohydrate, sugar, and protein content.

Example 1

The inventive samples and comparative samples were tested using a TA-XTplus Texture Analyzer with a 10 kg load cell, using the 1.1 inch diameter crunchiness fixture from the TA-25C set. Compression tests were run at a test speed of 1.00 mm/sec to a depth of 9 mm into each test sample. At least 3 replicates of each inventive and comparative sample were analyzed. FIG. 3 shows a representative plot of the force versus time curves generated for each sample at time zero or the start of the aging study. The results are shown in Table 1.

TABLE 1

Texture Analysis, Fresh Samples

|  | INV | COMP A | COMP B |
| --- | --- | --- | --- |
| Avg. Peak Force (g) | 3193 | 8453 | 9183 |
| Avg. Positive Area (g*s) | 8506 | 37291 | 41984 |
| Avg. Crunchiness (No. of Peaks) | 46 | 13 | 5 |

As can be seen, the inventive INV sample had a substantially lower peak force and positive area, when compared to the COMP A and COMP B comparative samples. These values, which reflect the biting force and work required to chew each sample bite, show that the inventive sample is much softer than the comparative examples. However, surprisingly the inventive sample also exhibited a significantly greater number of peaks in the texture analysis curve than did either of the other comparative examples, as shown in exemplary curves in FIGS. 4 and 5A-B. Thus, unexpectedly, the inventive INV sample is both softer and crunchier than either of the comparative examples.

Example 2-5

The inventive sample and comparative samples were also tested after aging for 4-weeks at a series of different elevated (i.e., above ambient) temperatures. The inventive samples in the accelerated aging studies were also tested using a TA-XTplus Texture Analyzer with a 10 kg load cell, using the 1.1 inch diameter crunchiness fixture from the TA-25C set. Compression tests were run at a test speed of 1.00 mm/sec to a depth of 9 mm into each test sample. Again, at least 3 replicates of each inventive and comparative sample were analyzed. FIGS. 3B-E shows representative plots of the force versus time curves generated for each sample after aging for 4-weeks at the elevated temperatures of 70, 90, 100, and 120° F. The results are shown in Tables 2-5. The TA.XTPlus texture analyzer is equipped with a 10 kg (10000 g) load cell, but the instrument continues to perform analysis until a peak positive force of 13425 g is reached. Once 13425 g peak positive force is reached the instrument stops and aborts the analysis prior to completion. Therefore, any sample which reached the maximum peak positive force of 13425 g was labeled "max".

TABLE 2

Texture Analysis, 70° F. 4 weeks

|  | INV | COMP A | COMP B |
| --- | --- | --- | --- |
| Avg. Peak Force (g) | 3311 | 8796 | 10350 |
| Avg. Positive Area (g*s) | 10540 | 36872 | 57424 |
| Avg. Crunchiness (No. of Peaks) | 30 | 13 | 14 |

TABLE 3

Texture Analysis, 90° F. 4 weeks

|  | INV | COMP A | COMP B |
| --- | --- | --- | --- |
| Avg. Peak Force (g) | 3895 | 9822 | max |
| Avg. Positive Area (g*s) | 11137 | 55053 | max |
| Avg. Crunchiness (No. of Peaks) | 41 | 21 | max |

TABLE 4

Texture Analysis, 100° F. 4 weeks

|  | INV | COMP A | COMP B |
|---|---|---|---|
| Avg. Peak Force (g) | 4710 | max | max |
| Avg. Positive Area (g*s) | 12267 | max | max |
| Avg. Crunchiness (No. of Peaks) | 54 | max | max |

TABLE 5

Texture Analysis, 120° F. 4 weeks

|  | INV | COMP A | COMP B |
|---|---|---|---|
| Avg. Peak Force (g) | 3163 | max | max |
| Avg. Positive Area (g*s) | 9631 | max | max |
| Avg. Crunchiness (No. of Peaks) | 41 | max | max |

Example 6-8

The inventive samples and the two comparative samples were tested for oil loss, moisture loss, and total weight loss, as described above. At least 3 replicates of each inventive and comparative sample was analyzed. The test samples were stored at four testing temperatures: 70° F. (21° C.), 90° F. (32° C.), 100° F. (38° C.), and 120° F. (49° C.). After four weeks, the average cumulative oil loss, moisture loss, and average cumulative total weight loss for each group of samples were compared.

The graph of the cumulative oil loss, shown in FIGS. 6A-D, shows that the INV lost oil comprising about 1.23 to 4.39% of the sample weight at temperature ranges from 70° F. (21° C.)-120° F. (49° C.) over a 4 week aging study, which is lower than COMP A lost. While the INV samples did not lose less oil than Comp B, it is generally comparable up to a temperature of 100 F. More specifically: at 70° F. (21° C.) INV lost about 1.34% of oil, whereas COMP A lost about 0.69% oil and COMP B lost about 0.28% oil; at 90° F. (32° C.) INV lost about 1.62% of oil whereas COMP A lost about 6.31% oil and COMP B lost about 0.48% oil; at 100° F. (38° C.) INV lost about 1.23% of oil, whereas COMP A lost about 8.88% oil and COMP B lost about 0.47% oil; and at 120° F. (49° C.) INV lost about 4.39% of oil, whereas COMP A lost about 9.84% oil and COMP B lost about 0.83% oil.

The graph of the cumulative moisture loss, shown in FIGS. 7A-D, shows that the INV lost moisture comprising about 0.06 to 0.88% of the sample weight at temperature ranges from 70° F. (21° C.)-120° F. (49° C.) over a 4 week aging study, which is lower than either COMP A or COMP B lost. More specifically: at 70° F. (21° C.) INV lost about 0.06% of moisture, whereas COMP A lost about 1.48% moisture and COMP B lost about 0.65% moisture; at 90° F. (32° C.) INV lost about 0.42% of moisture whereas COMP A lost about 1.47% moisture and COMP B lost about 1.85% moisture; at 100° F. (38° C.) INV lost about 0.88% of moisture, whereas COMP A lost about 1.97% moisture and COMP B lost about 6.45% moisture; and at 120° F. (49° C.) INV lost about 0.72% of moisture, whereas COMP A lost about 2.77% moisture and COMP B lost about 4.32% moisture.

The graph of the cumulative total weight loss, shown in FIGS. 8A-D, shows that the INV lost cumulative total weight of about 1.40 to 5.11% at all temperatures, at temperature ranges from 70° F. (21° C.)-120° F. (49° C.) over a 4 week aging study, which is lower than COMP A and generally lower than COMP B lost. More specifically: at 70° F. (21° C.) INV lost about 1.40% total weight, whereas COMP A lost about 2.16% total weight and COMP B lost about 0.93% total weight; at 90° F. (32° C.) INV lost about 2.04% total weight whereas COMP A lost about 7.78% total weight and COMP B lost about 2.33% total weight; at 100° F. (38° C.) INV lost about 2.11% total weight, whereas COMP A lost about 10.85% total weight and COMP B lost about 6.92% total weight; and at 120° F. (49° C.) INV lost about 5.11% total weight, whereas COMP A lost about 12.62% total weight and COMP B lost about 5.15% total weight.

Thus, based on the results collectively as discussed herein, including the average peak force, the average positive area, the cumulative total oil, moisture, and weight loss, the inventive INV sample is surprisingly more shelf stable than either of the comparative samples.

Example 9

Several samples of INV were sealed in a plastic bag and stored at 100° F. (38° C.) for at least 80 days. Similarly, several samples of COMP A were also sealed in a plastic bag and stored at 100° F. (38° C.) for at least 80 days. The plastic bags were opened immediately after being removed from storage. It was observed that the coating of COMP A had melted completely, and this coating was smeared over the interior of the plastic bag. In contrast, the samples of INV were intact, with no evidence of melting or smearing inside the bag. Hence, the inventive samples INV were demonstrated to be thermally stable at 100° F. for at least 80 days.

Example 10

Figure 13:
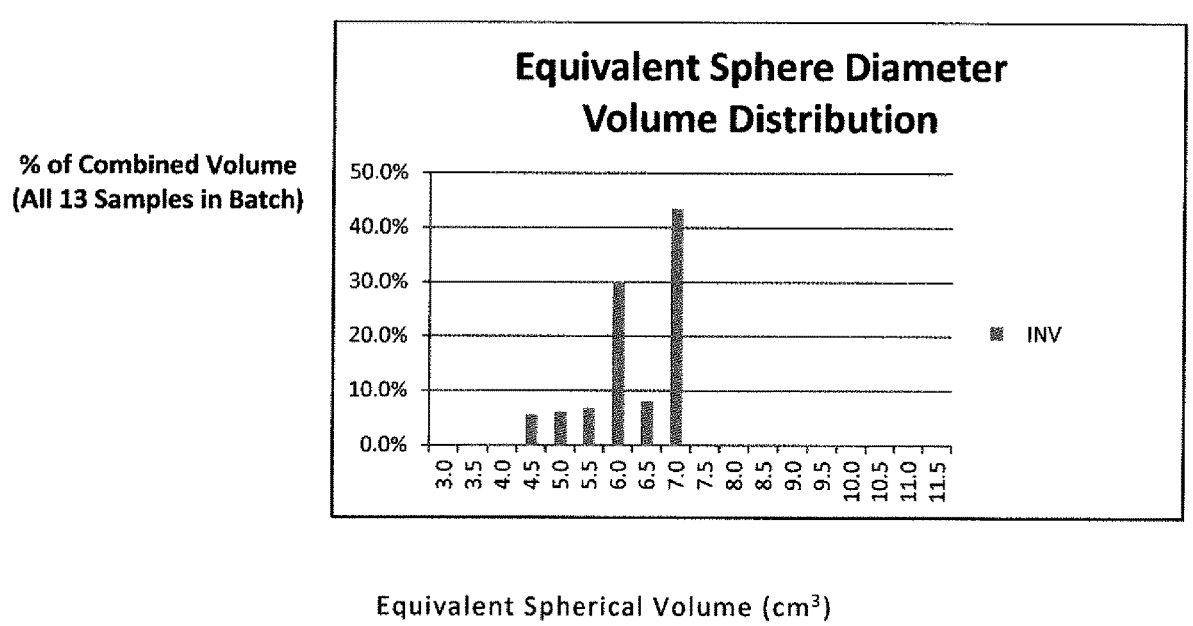
FIG. 13 is a histogram showing the range of equivalent spherical volumes (ESV) for a sampling from a representative batch of the inventive bite-sized snacks.

The equivalent spherical volumes (ESV) and equivalent spherical diameters (ESD) for a batch of the inventive samples INV were measured and calculated by the method described previously. Thirteen replicate samples total were measured. The weights of these samples were from about 4.0 g to about 8.0 g. A histogram of the ESV for these samples is shown in FIG. 13. A histogram of the ESD for these samples is shown in FIG. 14.

As shown in FIG. 13, the inventive samples INV had an ESV from about 4.5 cm$^3$ to about 7.0 cm$^3$. The largest % of the volume of all 13 INV samples in the batch combined was provided by bite-sized snacks having an ESV from about 6.0 cm$^3$ and about 7.0 cm$^3$. The mean ESV for this batch of INV samples was found to be 6.2 cm$^3$; the median ESV for this batch of INV samples was 6.0 cm$^3$; and the mode ESV for this batch of INV samples was 7.0 cm$^3$.

Figure 14:
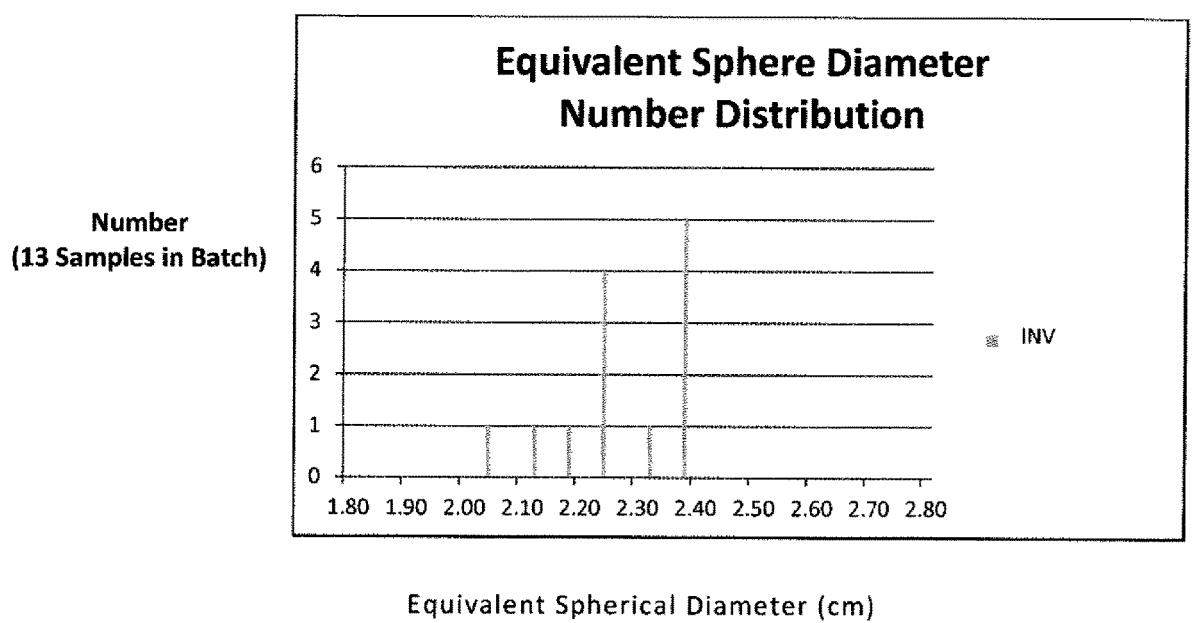
FIG. 14 is a histogram showing the range of equivalent spherical diameters (ESD) for a sampling from a representative batch of the inventive bite-sized snacks.

Similarly, as shown in FIG. 14, this batch of inventive samples INV had an ESD from about 2.05 cm to about 2.37 cm. Most of the INV samples in the batch had an ESD from about 2.2 cm and about 2.4 cm. The mean ESD for the batch of INV samples was found to be 2.27 cm; the median ESD for the batch of INV samples was 2.25 cm; and the mode ESD for the batch of INV samples was 2.38 cm.

Illustrative Embodiments (1) A shelf-stable bite-sized snack as shown and described herein.

(2) A shelf-stable bite-sized snack having an equivalent spherical diameter in the range of about 1-3 cm, the bite-sized snack comprising: (a) a soft inner core containing at least one nut butter and at least one stabilizer; and (b) a crunchy grain-based outer coating covering at least a portion of the outer surface of the inner core; wherein % total weight loss exhibited after holding the bite-sized snack at an elevated temperature for a period of 4 weeks is a measure of shelf stability, and wherein the bite-sized snack exhibits at about equal to or less than 1.40% total weight loss when the elevated temperature is 70° F.

(3) The illustrative embodiment (2), wherein the bite-sized snack exhibits at about equal to or less than 2.04% total weight loss when the elevated temperature is 90° F.

(4) Any one of the illustrative embodiments (2)-(3), wherein the bite-sized snack exhibits at about equal to or less than 2.11% total weight loss when the elevated temperature is 100° F.

(5) Any one of the illustrative embodiments (2)-(4), wherein the bite-sized snack exhibits at about equal to or less than 5.11% total weight loss when the elevated temperature is 120° F.

(6) Any one of the illustrative embodiments (2)-(5), wherein about equal to or less than 1.34% total weight loss exhibited by the bite-sized snack at the elevated temperature of 70° F. is due to loss of oil.

(7) Any one of the illustrative embodiments (2)-(6), wherein about equal to or less than 1.62% total weight loss exhibited by the bite-sized snack at the elevated temperature of 90° F. is due to loss of oil.

(8) Any one of the illustrative embodiments (2)-(7), wherein about equal to or less than 1.23% total weight loss exhibited by the bite-sized snack at the elevated temperature of 100° F. is due to loss of oil.

(9) Any one of the illustrative embodiments (2)-(8), wherein about equal to or less than 4.39% total weight loss exhibited by the bite-sized snack at the elevated temperature of 120° F. is due to loss of oil.

(10) Any one of the illustrative embodiments (2)-(9), wherein about equal to or less than 0.06% total weight loss exhibited by the bite-sized snack at the elevated temperature of 70° F. is due to loss of moisture.

(11) Any one of the illustrative embodiments (2)-(10), wherein about equal to or less than 0.42% total weight loss exhibited by the bite-sized snack at the elevated temperature of 90° F. is due to loss of moisture.

(12) Any one of the illustrative embodiments (2)-(10), wherein about equal to or less than 0.88% total weight loss exhibited by the bite-sized snack at the elevated temperature of 100° F. is due to loss of moisture.

(13) Any one of the illustrative embodiments (2)-(10), wherein about equal to or less than 0.72% total weight loss exhibited by the bite-sized snack at the elevated temperature of 120° F. is due to loss of moisture.

(14) A bite-sized snack as shown and described herein.

(15) A package as shown and described herein.

The present disclosure has been described with reference to exemplary embodiments. It should be emphasized that many variations and modifications may be made to the above-described embodiments, the elements of which are to be understood as being among other acceptable examples. Based on the foregoing disclosure, it should now be apparent that the bite-sized snacks as described herein will achieve the objectives set forth above. It is therefore to be understood that any variations evident fall within the scope of the claimed invention, and thus the selection of specific component elements can be determined without departing from the spirit of the invention disclosed and described herein. All such modifications and variations are intended to be included herein within the scope of this disclosure and protected by the following claims.

What is claimed is:

1. A bite-sized snack having an equivalent spherical diameter of about 1-3 cm, the bite-sized snack comprising:
   (a) a soft inner core containing at least one nut butter and at least one stabilizer; and
   (b) a crunchy granola outer coating on the inner core;
   wherein a texture analyzer instrument fitted with a 10 kg load cell and fitted with a 1.1 inch diameter crunchiness fixture is operated at a trigger force of 5 g, a test speed of 1 mm/sec and a distance of 9 mm to determine the texture of the bite-sized snack, and
   wherein the bite-sized snack has a soft texture, exhibiting a peak force in the range of about 800-5,000 g and a positive area in the range of about 2,000-15,000 g*sec.

2. The bite-sized snack of claim 1, wherein the bite-sized snack has a crunchy texture, exhibiting a crunchiness ranging from about 20-80 peaks at a threshold force of 5 g.

3. The bite-sized snack of claim 1, wherein the nut butter comprises a ground nut, seed, or legume selected from the group consisting of peanuts, almonds, pistachios, pecans, walnuts, cashews, macadamia nuts, hazelnuts, Brazilian nuts, pine nuts, sunflower seeds, sesame seeds, pumpkin seeds, soybeans, chickpeas, lentils, and mixtures thereof.

4. The bite-sized snack of claim 3, wherein the nut butter comprises roasted and ground peanuts.

5. The bite-sized snack of either of claim 1 or claim 3, wherein the crunchy granola outer coating comprises at least one dry particulate grain selected from whole oats, rolled oats, rolled rye, bulgur, barley meal, corn meal, quinoa, barley flakes, rye flakes, corn flakes, oat flakes, quinoa flakes, rice flakes, multigrain flakes, puffed oats, puffed corn, puffed rice, rice crisps, puffed quinoa, puffed rye, and mixtures thereof.

6. A package containing a plurality of bite-sized snacks, each bite-sized snack having an equivalent spherical diameter of about 1-3 cm, and wherein each bite-sized snack comprises:
   (a) a soft inner core containing at least one nut butter and at least one stabilizer; and
   (b) a crunchy granola outer coating on the inner core;
   wherein a texture analyzer fitted with a 10 kg load cell and fitted with a 1.1 inch diameter crunchiness fixture is operated at a trigger force of 5 g, a test speed of 1 mm/sec and a distance of 9 mm to determine the texture of the bite-sized snack, and
   wherein the bite-sized snack has a soft texture, exhibiting an average peak force based upon the plurality of bite-sized snacks in the range of about 800-5,000 g and an average positive area based upon the plurality of bite-sized snacks in the range of about 2,000-15,000 g*sec.

7. The package of claim 6, wherein each bite-sized snack has a crunchy texture, exhibiting an average crunchiness based upon the plurality of bite-sized snacks ranging from about 20-80 peaks at a threshold force of 5 g.

8. The package of either of claim 6 or claim 7, wherein each bite-sized snack further has an equivalent spherical volume of about 0.5-14.1 $cm^3$.

9. The package of claim 8, wherein the equivalent spherical diameters for the plurality of bite-sized snacks are distributed over a range of from about 2.05-2.37 cm.

10. The package of claim 8, wherein the equivalent spherical volumes for the plurality of bite-sized snacks are distributed over a range of from about 4.5-7.0 $cm^3$.

11. The package of claim 10, wherein the mean of the range is about 6.2 $cm^3$.

12. The package of claim 10, wherein the median of the range is about 6.0 cm³.

13. The package of claim 10, wherein the mode of the range is about 7.0 cm³.

14. The package of either of claim 6 or claim 7, wherein the plurality of bite-sized snacks range in weight from about 2-20 g each.

15. The package of claim 14, wherein the plurality of bite-sized snacks range in weight from about 4-8 g each.

16. The bite size snack according to claim 1, wherein the crunchy granola outer coating comprises whole oats, rolled oats, or a combination thereof.

17. The bite size snack according to claim 16, wherein the crunchy granola outer coating further comprises at least one of rice crisps, barley flakes, a sweetening agent, nuts, and dried fruit.

18. The bite size snack according to claim 1, wherein the crunchy granola outer coating consists essentially of at least one of whole oats, rolled oats, rice crisps, barley flakes, a sweetening agent, nuts, and dried fruit.

* * * * *